(12) United States Patent
Poulton et al.

(10) Patent No.: US 6,556,628 B1
(45) Date of Patent: Apr. 29, 2003

(54) METHODS AND SYSTEMS FOR TRANSMITTING AND RECEIVING DIFFERENTIAL SIGNALS OVER A PLURALITY OF CONDUCTORS

(75) Inventors: John W. Poulton, Chapel Hill, NC (US); Stephen G. Tell, Chapel Hill, NC (US); Robert E. Palmer, Santa Clara, CA (US)

(73) Assignee: The University of North Carolina at Chapel Hill, Chapel Hill, NC (US)

( * ) Notice: Subject to any disclaimer, the term of this patent is extended or adjusted under 35 U.S.C. 154(b) by 0 days.

(21) Appl. No.: 09/302,461

(22) Filed: Apr. 29, 1999

(51) Int. Cl.[7] .................................................. H04B 3/00
(52) U.S. Cl. ..................... 375/257; 375/286; 375/288; 375/316
(58) Field of Search ............................. 375/257, 214, 375/292, 316, 270, 286, 288, 219, 295; 341/59, 50

(56) References Cited

U.S. PATENT DOCUMENTS

| | | | |
|---|---|---|---|
| 4,486,739 A | * 12/1984 | Franaszek et al. | 375/316 |
| 5,864,587 A | 1/1999 | Hunt | 375/316 |
| 6,026,124 A | * 2/2000 | Lee et al. | 375/292 |
| 6,178,198 B1 | * 1/2001 | Samueli et al. | 375/214 |
| 6,359,931 B1 | * 3/2002 | Perino et al. | 375/257 |

OTHER PUBLICATIONS

Bell Technical Staff, "A History of Engineering and Science in the Bell System," Bell Telephone Laboratories, p. 236–240, (1975).
Marbot et. al., "Integration of Multiple Bidirectional Point-to-Point Serial Links in the Gigabits per Second Range," IEEE Hot Interconnects Symposium (Stanford University), (Aug., 1993), p. 1–9.

(List continued on next page.)

*Primary Examiner*—Shuwang Liu
(74) *Attorney, Agent, or Firm*—Jenkins & Wilson, P.A.

(57) ABSTRACT

Methods and systems for differential signaling include transmitting differential signals over N conductors, where N is greater than 2, from a sender to a receiver. The sender includes multiple transmitters that receive digital data and produce output signals based on the digital data. The output signals result in currents on conductors between the transmitters and multiple receivers. For any given symbol, the sum of the currents on the conductors is preferably equal to zero. In addition, a voltage difference preferably exists across the input terminals of each receiver. Methods and systems for coding binary data for transmission over a multi-conductor differential signaling system include converting input binary data into symbol numbers, converting the symbol numbers into valid drive words for a multi-conductor differential signaling system, and inputting the valid drive words to multiple differential transmitters.

33 Claims, 16 Drawing Sheets

OTHER PUBLICATIONS

Sidiropoulos et al., "A CMOS 500 Mbps/pin Synchronous Point to Point Link Interface," IEEE Symposium on VLSI Circuits Digest of Technical Papers (Stanford, California), p. 43–44, (1994).

Lee et al., "A CMOS Serial Link for Fully Duplexed Data Communication," IEEE Journal of Solid–State Circuits, vol. 30 (No. 4), p. 353–364, (Apr. 1995).

Yang et al., "A 0.8um CMOS 2.5Gb/s Oversampled Receiver for Serial Links," Proc. of 1996 International Solid State Circuits Conference, p. 200–201, (Dec. 1996).

Yang et. al., "A 0.8um CMOS 2.5Gb/s Oversampling Receiver and Transmitter for Serial Links," IEEE Journal of Solid–State Circuits, vol. 31 (No. 12), p. 2015–2023, (Dec., 1996).

Johns et al., "Integrated Circuits for Data Transmission Over Twisted–Pair Channels," IEEE Journal of Solid–State Circuits, vol. 32 (No. 3), p. 398–406, (Mar. 1997).

ANSI/TIA/EIA, "Electrical Characteristics of Low Voltage Differential Signaling (LVDS) Interface Circuits," Standard ANSI/TIA/EIA–644–1995, p. i–30, (Mar., 1996).

Fiedler et al., "A 1.0625Gbps Transceiver with 2X–Oversampling and Transmit Signal Pre–Emphasis," Proc. of 1997 IEEE International Solid State–State Circuits Conference, p. 238–239, (Feb. 1997).

Lee et al., "A Jitter–Tolerant 4.5Gb/s CMOS Interconnect for Digital Display," Proc. of 1998 IEEE International Solid–State Circuits Conference, p. 310–311, (Feb. 1998).

Gu et al., "A 0.5–3.5Gb/s Low–Power Low–Jitter Serial Data CMOS Transceiver," Proc. of 1999 IEEE International Solid–State Circuits Conference, p. 352–353, (Feb. 1999).

Dally et al., "Transmitter Equalization for 4–GBPS Signaling," IEEE Micro, p. 48–56, (Jan./Feb., 1997).

Poulton et al., "A Tracking Clock Recovery Receiver for 4–GBPS Signaling," IEEE Micro, p. 25–37, (Jan./Feb., 1998).

H. Bakoglu, "Circuits, Interconnections and Packaging for VLSI," Addison–Wesley Publishing Company, Chapter 4, p. 134–193, (Jan. 1990).

Dally et al., "Digital Systems Engineering," Cambridge University Press, p. 304–355 (Sep. 10, 1998).

* cited by examiner

US 6,556,628 B1

METHODS AND SYSTEMS FOR TRANSMITTING AND RECEIVING DIFFERENTIAL SIGNALS OVER A PLURALITY OF CONDUCTORS

GOVERNMENT INTEREST

This invention was made with government support under Defense Advanced Research Projects Agency (DARPA) contract number E253. The Government has certain rights to this invention.

TECHNICAL FIELD

The present invention relates generally to improved methods and systems for transmitting and receiving differential signals. More particularly, the present invention relates to methods and systems for transmitting and receiving differential signals over a plurality of conductors.

RELATED ART

Signaling is the method by which information is communicated from one part of an electronic system to another. In single-ended signaling, a single conductor, such as a wire, is used to transmit data from a transmitter to a receiver. In binary single-ended signaling, a transmitter encodes a binary digit as a voltage value or a current value on the conductor. For example, in binary single-ended signaling systems commonly used in computer communications, a logical "1" may be indicated by a voltage of about +5 volts and a logical "0" may be indicated by a voltage of about 0 volts. A receiver converts the signal on the conductor into a binary digit by comparing a received voltage or current with a local reference voltage or current.

FIG. 1 is a circuit diagram illustrating a conventional binary single-ended signaling system. In this system, a transmitter 100 receives binary data and outputs a voltage signal on a conductor 102 based on the state of the binary data. For example, if the transmitter 100 receives a logical "1", the transmitter 100 may output a signal of about +5V on the conductor 102. If the transmitter receives a logical "0", the transmitter may output a signal of about 0V on the conductor 102. The two possible values, 0V and +5V, of the signal represent two possible symbols or data units of the binary single-ended signaling system. The symbols encode the data bits "0" and "1". A receiver 104 comprises a comparator that converts the voltage on the conductor 102 to binary data by comparing the received signal to a reference voltage $V_{REF}$. If the voltage of the received signal is greater than the voltage $V_{REF}$, the receiver outputs a high voltage or logical "1". If the voltage on the conductor 102 is less than the voltage $V_{REF}$, the receiver 104 outputs a low voltage or logical "0".

One problem associated with conventional single-ended signaling systems is that the requirement of a local reference voltage at the receiver results in increased power consumption. For example, the power required to transmit one bit in a single-ended signaling system includes not only the power required to send the signal over conductor 102, but also power required by a direct current voltage source to provide the reference voltage $V_{REF}$ at the receiver. Another problem associated with requiring a local reference at the receiver is that engineering a stable reference voltage may be difficult.

Another disadvantage associated with conventional single-ended signaling systems is that noise introduced in the signal transmitted over the conductor 102 may result in bit errors in the binary data output from the receiver 104. For example, the transmitter may encode a logical "0" as a low voltage signal on the transmission line. Additive noise may be introduced into the channel between the transmitter 100 and the receiver 104 and cause the low voltage signal to rise above the threshold voltage $V_{REF}$. As a result, the receiver 104 may decode the signal as a logical "1" when a logical "0" was intended to be transmitted.

In order to alleviate the problems of requiring a local reference and bit errors caused by additive noise, differential signaling systems have been developed. In a differential signaling system, two conductors are oppositely driven to transmit a single signal. The receiver detects the difference between the voltages or currents on the two conductors. As a result, no local reference is required at the receiver. In addition, if the conductors are physically similar and positioned close to each other, noise introduced into the channel will be common to both conductors or common-mode noise. Receivers can be easily designed, e.g., using differential amplifiers, to cancel the common-mode noise.

FIG. 2 illustrates an example of a conventional differential signaling system. In FIG. 2, a transmitter 200 converts an input stream of binary data bits into a pair of equal and opposite currents at its outputs. The currents are transmitted through a pair of conductors 201 and 202 to a receiver 203. In order to transmit a logical "1" to the receiver 203, the transmitter 200 generates current flowing towards the receiver on the conductor 201 and an equal but opposite current flowing towards the transmitter 200 on the conductor 202. Similarly, in order to transmit a logical "0", the transmitter generates a current flowing towards the transmitter on the conductor 201 and an equal but opposite current flowing towards the receiver 203 on the conductor 202.

In order to decode the received signals, the receiver 203 detects the voltage difference between ends 204 and 205 of a resistive terminator 206. If the voltage difference is positive, i.e., the voltage at end 204 is higher than the voltage at end 205, the receiver 203 may output a logical "1". If the voltage difference is negative, i.e., the voltage at the end 204 is lower than the voltage at the end 205, the receiver 203 may output a logical "0". In addition to converting the currents on the conductors 201 and 202 into voltages, the terminator 206 also reduces reflections on the conductors 201 and 202.

In addition to the advantages of operating without a local reference voltage and rejecting common-mode noise, differential signaling systems provide a larger signal swing for detection by the receiver than single-ended systems. For example, the voltage on each of the conductors 201 and 202 may swing from +V to −V, resulting in a voltage difference of 4V volts between symbols. Applying the same voltage ranging from −V volts to +V volts to a conductor of a single-ended signaling system results in a voltage difference of, at most, 2V volts difference between symbols. As a result of the increased voltage difference between symbols, differential signals have increased immunity to noise.

One disadvantage of differential signaling systems with respect to single-ended signaling systems is that conventional differential signaling systems require twice as many conductors as single-ended systems to transmit a given signal. That is, for a signal having M different signal levels or symbols, where M=2, one bit is transmitted per symbol in both single-ended and differential signaling systems. However, in single-ended signaling systems, the number of bits per symbol per conductor is 1; whereas, in differential signaling systems, the number of bits per symbol per conductor is 0.5. Thus, conventional two-conductor differential signaling systems are one-half as efficient as single-ended signaling systems with respect to the number of bits transmitted per symbol per conductor.

In order to improve the bits-per-conductor efficiency of differential signaling systems, pairs of differential signal conductors may be connected and driven to create additional channels per conductor. FIG. 3 illustrates one conventional method for improving the efficiency of a differential signaling channel. In FIG. 3, three differential channels X, Y, and Z are implemented using four conductors. Channels X and Y are conventional differential channels. The third channel, channel Z, is created without adding additional conductors. In the telephony industry, the third channel, channel Z, is referred to as a phantom channel.

In FIG. 3, channel X consists of a transmitter 300, conductors 301 and 302, a receiver 303, and center-tapped terminators 304 and 305. Channel Y consists of a transmitter 306, conductors 307 and 308, a receiver 309, and center-tapped terminators 310 and 311. In the illustrated circuit, the transmitter 300 transmits differential signals to the receiver 303 over the conductors 301 and 302, based on the digital input data $X_{In}$. Similarly, the transmitter 306 transmits differential signals to the receiver 309 over the conductors 307 and 308, based on the digital input data $Y_{In}$.

The phantom channel, channel Z, is created by.driving the common-mode voltage of the X and Y channels. More particularly, a transmitter 312 is connected to the center taps of the terminators 305 and 311. A receiver 313 is connected to the center taps of the terminators 304 and 310. The transmitter 312 establishes a voltage difference between the center taps of the terminators 304 and 310 in response to the signal $Z_{In}$. The receiver 313 detects the voltage difference across the center taps of the terminators 304 and 310 and produces a digital output signal $Z_{Out}$. The voltage difference generated by the transmitter 312 does not affect the signals $X_{Out}$ or $Y_{Out}$ because the receivers 303 and 309 cancel the signal produced by the transmitter 312. The phantom channel creates an additional data path between the transmitters and receivers without requiring an additional conductor between the transmitters and receivers. Since the illustrated system is capable of transmitting three bits per symbol on four conductors, the efficiency is 0.75 bits per symbol per conductor.

FIG. 4 illustrates a well known conventional extension of the idea of driving the common-mode voltages of differential channels in which seven data channels are created using four pairs of differential conductors. In FIG. 4, channels X, Y, X', and Y' are conventional differential channels, as previously described. Channels Z and Z' are phantom channels, as described with respect to FIG. 3. A seventh channel, channel W, is created by driving and detecting the common-mode voltage of the phantom channels Z and Z'. The seventh channel is referred to in the telephony industry as a ghost channel. Because eight conductors are used to transmit seven symbols, each symbol encodes one bit, the efficiency of a communications system including a ghost channel is 7/8 bits per symbol per conductor.

The idea of driving the common-mode voltages of differential channels can be further extended to include a wraith channel. A wraith channel is created by driving the common-mode voltage of two ghost channels. In a system including a wraith channel, for two signal levels, 16 conductors transmit 15 symbols, and each symbol encodes one bit. Thus, the efficiency of a system using a wraith channel is 15/16 bits per symbol per conductor, which is near the efficiency of a single-ended signaling system.

One problem with the phantom/ghost/wraith channel hierarchy is that the absolute value of signals at a given receiver may be driven outside the common-mode range of the receiver. The common-mode range is the allowable voltage range at the input terminals of the receiver. In practice, the common-mode range may be limited such that the absolute voltage at either input terminal of the receiver never exceeds the voltage on the higher power supply terminal, nor falls below the voltage on the lower power supply terminal. Thus, even though phantom, ghost, and wraith channels improve the efficiency of differential signaling systems, they are limited by common-mode voltage range of the receiver. In addition, phantom, ghost, and wraith channels are unable to achieve the efficiency in bits per symbol per conductor of a single-ended signaling system.

One conventional method that may be used to improve the efficiency of any signaling system is to transmit more than one bit per symbol. In order to transmit more than one bit per symbol, more than two symbols for encoding data are required. One method of providing multiple symbols is to utilize multiple signal levels, where each signal level represents a different symbol. This technique is referred to as amplitude modulation. For example, a signaling system may include three possible signal levels: −V, 0, and +V, corresponding to three symbols. In a single-ended signaling system, an efficiency of $\log_2(N)$, where N is the number of symbols, can be achieved. Therefore, for three symbols, an efficiency of $\log_2(3)$ or about 1.5 bits per symbol per conductor can be achieved. The efficiency of a corresponding differential signaling system is 0.75. However, as discussed above, single-ended signaling systems require a local reference at the receiver, and when transmitting multiple signal levels, multiple references are required at the receiver. A conventional multi-level differential signaling system requires a receiver that compares the magnitude of the received signal to one or more references. Providing multiple receiver references increases power consumption and requires the engineering of stable DC sources.

Therefore, there exists a long-felt need for a differential signaling system having improved efficiency with respect to the number of bits transmitted per symbol per conductor, without requiring a local reference at the receiver.

DISCLOSURE OF THE INVENTION

Methods and systems for differential signaling according to the present invention result in increased efficiency in bits per symbol per conductor over conventional differential signaling systems. In order to achieve this increased efficiency, output signals from differential transmitters are summed and transmitted over multiple conductors to differential receivers. Summing the output signals results in multiple signal levels being transmitted to the receivers. However, unlike conventional multi-level signaling, no local reference is required at the receivers. The receivers need only detect the sign (positive or negative) of the received signal.

As used herein, the term "symbol" refers to a data unit transmitted or received during a single time period, such as a system clock period. The time period for transmitting or receiving a symbol is referred to herein as a symbol time. In a single-conductor signaling system, a symbol may be defined as a signal voltage or current level on the conductor. In a multi-conductor signaling system, a symbol may be defined as a combination of voltage or current levels on the conductors.

It is therefore the object of the present invention to provide methods and systems for transmitting and receiving differential signals over a plurality of conductors with improved efficiency in terms of the number of bits transmitted per symbol per conductor.

It is another object of the present invention to provide methods and systems for encoding and decoding binary data to be transmitted over a multi-conductor signaling system according to embodiments of the present invention.

Some of the objects of the invention having been stated hereinabove, other objects will become evident as the description proceeds, when taken in connection with the accompanying drawings as best described hereinbelow.

BRIEF DESCRIPTION OF THE DRAWINGS

A description of the present invention will now proceed with reference to the accompanying drawings of which.

BEST MODE FOR CARRYING OUT THE INVENTION

Embodiments of the present invention include methods and systems for transmitting $N!/(2(N-2)!)$ differential signals over N conductors between groups of differential transmitters and receivers, where N is an integer, preferably greater than two. The following description includes examples of differential signaling systems for N=3 and N=4. However, the multi-conductor signaling systems of the present invention may include any number of conductors.

Three Conductor Differential Signaling

Figure 5:
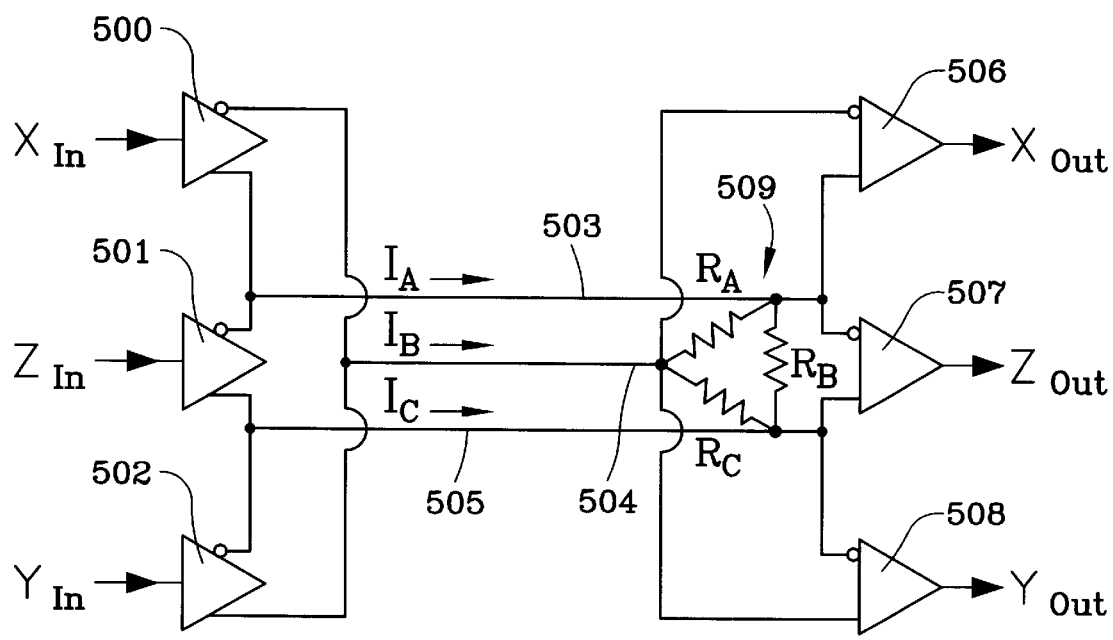
FIG. 5 is a circuit diagram illustrating an exemplary three-conductor differential signaling system according to an embodiment of the present invention.

FIG. 5 illustrates a three-conductor differential signaling system according to an embodiment of the present invention. In the illustrated embodiment, transmitters 500–502 transmit currents $I_A$, $I_B$, and $I_C$ over three conductors 503–505 to receivers 506–508. Each of the transmitters 500–502 may be a differential current transmitter that receives digital data at an input terminal, and produces first and second complementary currents at first and second output terminals. Exemplary circuit elements that may be used as the transmitters 500–502 are known as line drivers. The conductors 503–505 are each connected to more than one of the outputs of the transmitters 500–502 such that each of the currents $I_A$, $I_B$, and $I_C$ is the sum of the output currents from two of the transmitters.

The present invention is not limited to transmitters that produce currents based on the input data. For example, in an alternative embodiment, the transmitters 500–502 may each comprise a differential voltage transmitter that receives the digital data at an input terminal, and produces first and second complementary output voltages at first and second output terminals, based on the digital data. In such an embodiment, a resistor network or other appropriate means is preferably connected to the output of the transmitters to sum the six output voltages from the transmitters onto three conductors. A voltage-mode embodiment of a three-conductor signaling system according to the invention will be described in more detail below.

The conductors 503–505 may be any type of conductors capable of carrying an electrical signal. For example, in a computer communications system, the conductors may comprise traces on a printed circuit board. In an alternative embodiment, the conductors may comprise wires used to connect one electronic system with another electronic system for high speed serial communications. In order to facilitate noise reduction at the receiver, the conductors 503–505 are preferably physically similar to each other and positioned closely to each other. Utilizing conductors of similar structure and positioning the conductors closely to each other increases the likelihood that noise introduced into the system will be common-mode noise. Common-mode noise can be easily rejected utilizing receivers with high common-mode rejection ratios.

In the embodiment illustrated in FIG. 5, a terminator 509 includes resistors $R_A$, $R_B$, and $R_C$. The resistors $R_A$, $R_B$, and $R_C$ preferably have resistance values selected to reduce reflections on the conductors 503–505. For example, the resistance value of each of the resistors may be chosen to have a predetermined relationship with the characteristic impedances of the conductors 503–505. For example, each of the resistance values may be equal to the average of the modal characteristic impedances of the conductors 503–505.

In addition to reducing reflections, the resistors $R_A$, $R_B$, and $R_C$ convert the currents $I_A$, $I_B$, and $I_C$ into voltages to be detected by the receivers 506–508. Because the currents on the conductors 503–505 are preferably not equal to each other, there will be a voltage difference for detection across the resistors $R_A$, $R_B$, and $R_C$.

The receivers 506–508 may be any type of differential receivers. For example, in the illustrated embodiment, the receivers are comparators. Each of the receivers includes an inverting input and a non-inverting input connected across one of the resistors $R_A$, $R_B$, and $R_C$. Each of the receivers 506–508 produces a digital output signal $X_{Out}$–$Z_{Out}$ based on the voltage difference at its input terminals.

Figure 5A:
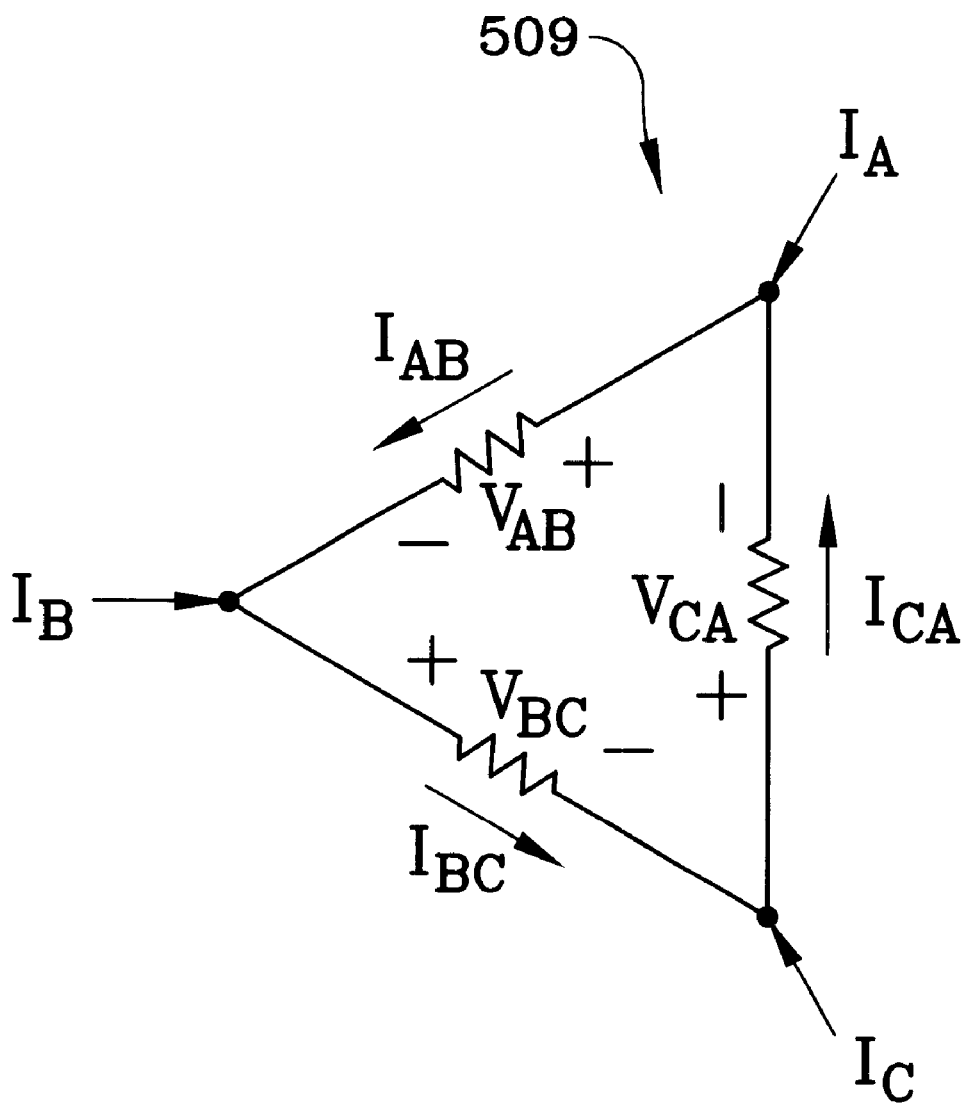
FIG. 5(a) is a circuit diagram illustrating signal currents flowing through the terminator of the three-conductor differential signaling system illustrated in FIG. 5.

FIG. 5(a) illustrates the terminator 509 and the currents $I_{AB}$, $I_{BC}$, and $I_{CA}$ flowing through the resistors $R_A$, $R_B$, and $R_C$. Applying Kirchoff's voltage and current laws, the nodal equations for the currents illustrated in FIG. 5(a) are:

$$I_A = I_{AB} - I_{CA}, \quad (1)$$

$$I_B = I_{BC} - I_{AB}, \text{ and} \quad (2)$$

$$I_C = I_{CA} - I_{BC}. \quad (3)$$

The voltages across the input terminals of the receivers 506–508 are:

$$V_{AB} = I_{AB} R_A, \quad (4)$$

$$V_{BC} = I_{BC} R_B, \text{ and} \quad (5)$$

$$V_{CA} = I_{CA} R_C. \quad (6)$$

Applying Kirchoff's voltage law to the terminator, the sum of the voltages across the terminator resistors is zero. As a result, when $R_A = R_B = R_C = R$, $$I_{AB} + I_{BC} + I_{CA} = 0. \quad (7)$$

Subtracting equation (1) from equation (2)

$$I_A - I_B = I_{AB} - I_{CA} - I_{BC} + I_{AB} 2I_{AB} = I_A = I_B + I_{BC} + I_{CA}. \quad (8)$$

From equation (7), $I_{BC} + I_{CA} = -I_{AB}$. Thus, equation (8) can be rewritten as $$2I_{AB} = I_{AB} - I_B - I_{AB} I_{AB} = \tfrac{1}{3}(I_A - I_B). \quad (9)$$

Equations for $I_{BC}$ and $I_{CA}$ are derived in a manner similar to equation (9).

$$I_{BC} = \tfrac{1}{3}(I_B - I_C) \quad (10)$$

$$I_{CA} = \tfrac{1}{3}(I_C - I_A) \quad (11)$$

From equations (4), (5), and (6), the voltages across the terminator resistors are:

$$V_{AB} = I_{AB} R,$$

$$V_{BC} = I_{BC} R, \text{ and}$$

$$V_{CA} = I_{CA} R.$$

Thus, substituting equations (9), (10), and (11) into equations (4), (5), and (6), the voltages across the receiver inputs are:

$$V_{AB} = \tfrac{1}{3} R (I_A - I_B), \quad (12)$$

$$V_{BC} = \tfrac{1}{3} R (I_B - I_C), \text{ and} \quad (13)$$

$$V_{CA} = \tfrac{1}{3} R (I_C - I_A), \quad (14)$$

According to an important aspect of the invention, it is preferable that a voltage or current difference exist at the input terminals of each of the receivers. In the illustrated embodiment, the voltage difference at the receivers is determined by the differences between the currents $I_A$, $I_B$, and $I_C$, as defined in equations (12), (13), and (14). Thus, in order for the voltage difference across the input terminals of the receivers to be non-zero, it is preferable that $I_A \neq I_B \neq I_C$.

According to another important aspect of the invention, it is preferable that the sum of the currents $I_A$, $I_B$, and $I_C$ be equal to zero for any given symbol. For example, if $I_A = 2A$ and $I_B = -2A$ for a given symbol, then it is preferable that $I_C = 0A$.

According to yet another important aspect of the invention, it is preferable that the number of signal levels be equal to the number of conductors between a group of transmitters and a group of receivers. For example, in the embodiment illustrated in FIG. 5, three conductors connect the transmitters to the receivers. Thus, in such an embodiment, it is preferable that $I_A$, $I_B$, and $I_C$ have no more than three different signal levels. Utilizing a number of signal levels equal to the number of conductors allows received signals to be decoded without requiring a local reference at the receivers.

Table 1 shown below illustrates permissible current values for the currents $I_A$, $I_B$, and $I_C$. Table 1 also illustrates the voltages appearing across the input terminals of the receivers. In the table, "i" represents the current output from one output terminal of each of the transmitters, "V" represents the voltage drop across each of the terminator resistors, and "R" represents the resistance of each of the terminator resistors. The conditions that $I_A$, $I_B$, and $I_C$ be unequal and sum to zero allows one of six possible symbols to be transmitted during each time period.

TABLE 1

Permissible Currents, Receiver Input Voltages, and Corresponding Bit Values for Three-Conductor Differential Signaling

| $I_A$ | $I_B$ | $I_C$ | $V_{A-B}$ | $V_{B-C}$ | $V_{C-A}$ | X | Y | Z |
|---|---|---|---|---|---|---|---|---|
| -2i | 0 | +2i | -2/3V | -2/3V | +4/3V | 0 | 0 | 1 |
| 0 | +2i | -2i | -2/3V | +4/3V | -2/3V | 0 | 1 | 0 |
| -2i | +2i | 0 | -4/3V | +2/3V | +2/3V | 0 | 1 | 1 |
| +2i | -2i | 0 | +4/3V | -2/3V | -2/3V | 1 | 0 | 0 |
| 0 | -2i | +2i | +2/3V | -4/3V | +2/3V | 1 | 0 | 1 |
| +2i | 0 | -2i | +2/3V | +2/3V | -4/3V | 1 | 1 | 0 |

The leftmost three columns in Table 1 illustrate current values corresponding to each of the six symbols. The three central columns in Table 1 represent the voltage differences across the receiver inputs corresponding to each of the six symbols. The rightmost three columns in Table 1 illustrate valid input bit combinations that correspond to the permissible current values. The six symbols represent six of eight possible encodings of three binary digits. The bit combinations 000 and 111 are preferably not allowed, since these bit patterns would result in voltage differences of zero volts across the receiver inputs.

In the illustrated example, one of six possible symbols representing one of six possible bit patterns may be transmitted during each symbol time. Thus, each symbol encodes $\log_2(6)$, or approximately 2.5 bits. The symbols are transmitted over three conductors. As a result, the efficiency of the three-conductor differential signaling system according to the present embodiment is $\log_2(6)/3$, or approximately 0.83 bits per symbol per conductor. Conventional two-conductor differential signaling systems are capable of transmitting data at 0.5 bits per symbol per conductor. Thus, the present embodiment is capable of transmitting data 67% more efficiently than conventional two-conductor differential signaling systems.

Moreover, no reference is required at the receiver, since each set of transmitted voltages or currents produces voltage differences at each pair of receiver inputs. In addition, since the three conductors are preferably physically similar and closely coupled to each other, noise injected into the system will be common-mode noise that can be easily rejected by the receivers. The power required by a typical three-conductor system according to the present embodiment is lower than the power required by three single-ended channels. However, the power per conductor is higher than the power per conductor of a conventional two-conductor differential signaling system by a factor of three. As a result, improved efficiency has a cost in increased power consumption.

In computer communication systems, data is commonly transferred in eight-bit units, known as bytes. Since eight bits correspond to $2^8=256$ possible symbols, it is preferable to design a signaling system capable of producing at least 256 symbols. Since the three-conductor differential signaling system described above utilizes base-six symbols, it is preferable to extend the number of symbols transmitted by the system in powers of six to produce at least 256 symbols. For example, $6^4=1296$ is the lowest power of six that results in greater than 256 symbols. Four of the three-conductor differential signaling systems illustrated in FIG. 5 may be connected in parallel to produce 1296 symbols during a single symbol time. Alternatively, a single three-conductor signaling system as illustrated in FIG. 5 may send symbols over four successive time intervals to produce 1296 symbols. In either system, a surplus of 1296−256=1040 symbols results. The surplus symbols may be used for a variety of tasks, including parity, ensuring sufficient bit transitions, clock recovery, DC balancing, sending out-of-band control characters, and/or error detection. Coding for multi-conductor signaling systems according to the embodiments of the invention will be discussed in more detail below.

Four-conductor Differential Signaling

Figure 6:
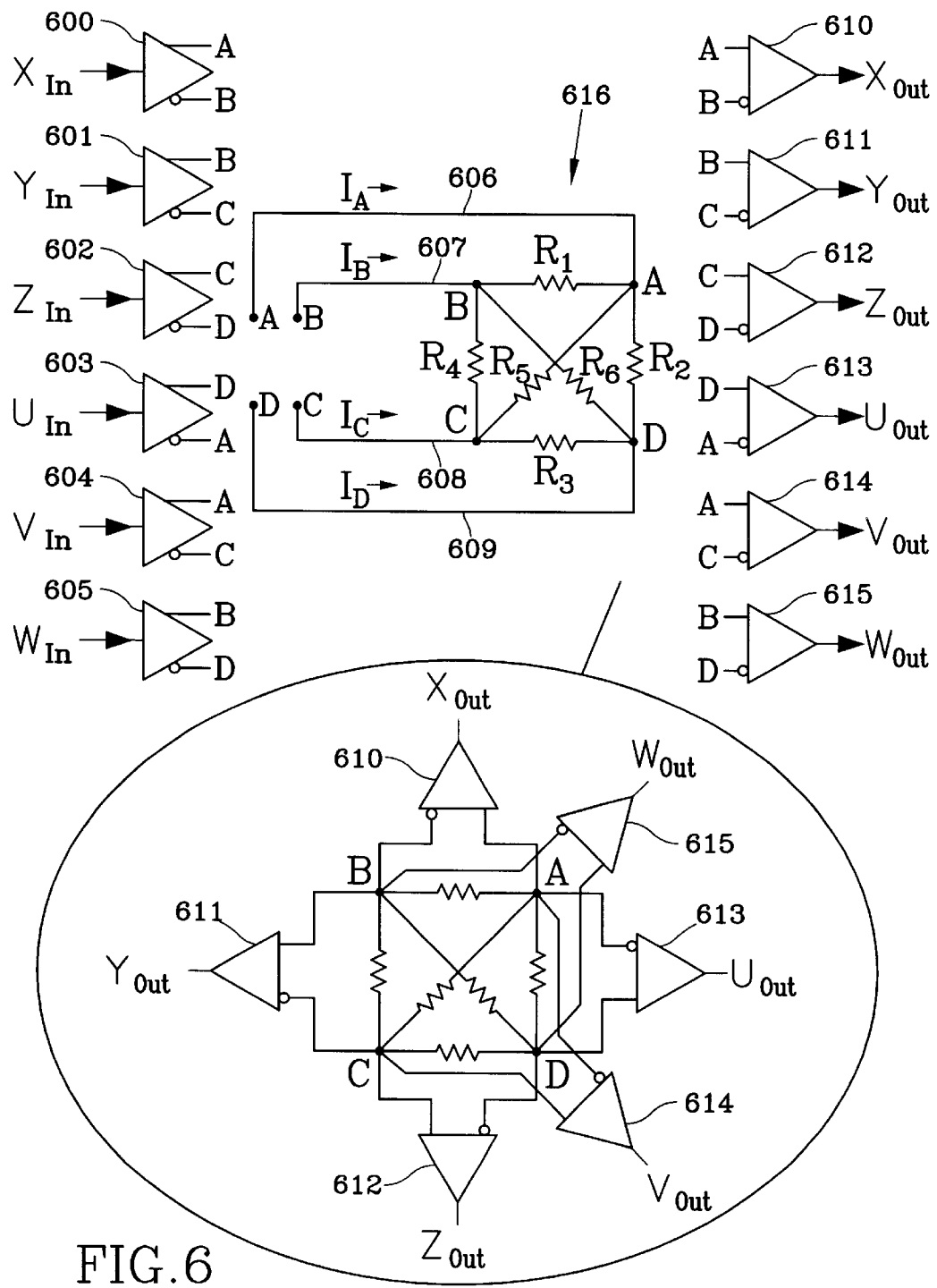
FIG. 6 is a circuit diagram illustrating an exemplary four-conductor differential signaling system according to an embodiment of the present invention.

FIG. 6 illustrates a four-conductor differential signaling system according to an embodiment of the present invention. In the illustrated embodiment, transmitters 600–605 transmit currents $I_A$, $I_B$, $I_C$, and $I_D$ over four conductors 606–609 to receivers 610–615. The transmitters 600–605 each comprise a differential current transmitter that receives digital data at an input terminal and produces first and second complementary currents at first and second output terminals, based on the digital data. Exemplary circuit elements that may be used as the transmitters 600–605 are referred to as line drivers. The conductors 606–609 are each connected to multiple outputs of the transmitters 600–605, such that the currents $I_A$, $I_B$, $I_C$, and $I_D$ are each the sum of three of these outputs.

The present invention is not limited to transmitters that produce currents based on the input data. For example, in an alternative embodiment, the transmitters 600–605 may each comprise a differential voltage transmitter having an input that receives the digital data at an input terminal and produces first and second complementary voltages at first and second output terminals, based on the digital data. In such an embodiment, a resistor network or other appropriate means is preferably connected to the output of the transmitters to sum the 12 output voltages from the transmitters onto four conductors.

The conductors 606–609 may be any type of conductors capable of carrying an electrical signal. For example, in a computer communications system, the conductors may comprise traces on a printed circuit board. In an alternative embodiment, the conductors may comprise wires used to connect one electronic system with another electronic system for high speed serial communications. In order to facilitate noise reduction at the receiver, the conductors 606–609 are preferably physically similar to each other and positioned closely to each other. Utilizing conductors of similar structure and positioning the conductors near each other increases the likelihood that noise introduced into the system will be common-mode noise. Common-mode noise can be easily rejected utilizing a receiver with a high common-mode rejection ratio.

A terminator 616 includes resistors R1–R6. The resistors R1–R6 preferably have resistance values selected to reduce reflections on the conductors 606–609. For example, the resistance values of each of the resistors may be chosen to have a predetermined relationship with the characteristic impedances of the conductors 606–609. For example, the resistances may each be equal to the average of the modal characteristic impedances of the conductors 606–609.

In addition to reducing reflections, the resistors R1–R6 convert the currents $I_A$, $I_B$, $I_C$, and $I_D$ into voltages to be detected by the receivers 610–615. Because the currents on the conductors 606–609 are preferably not equal to each other, there will be a voltage difference for detection across the resistors R1–R6.

The receivers 610–615 may be any type of differential receivers. For example, in the illustrated embodiment, the receivers are comparators. Each of the receivers includes an inverting input and a non-inverting input connected across one of the resistors R1–R6. Each of the receivers 610–615 produces a digital output signal $X_{Out}$–$W_{Out}$ based on the voltage difference at its input terminals.

Figure 6A:
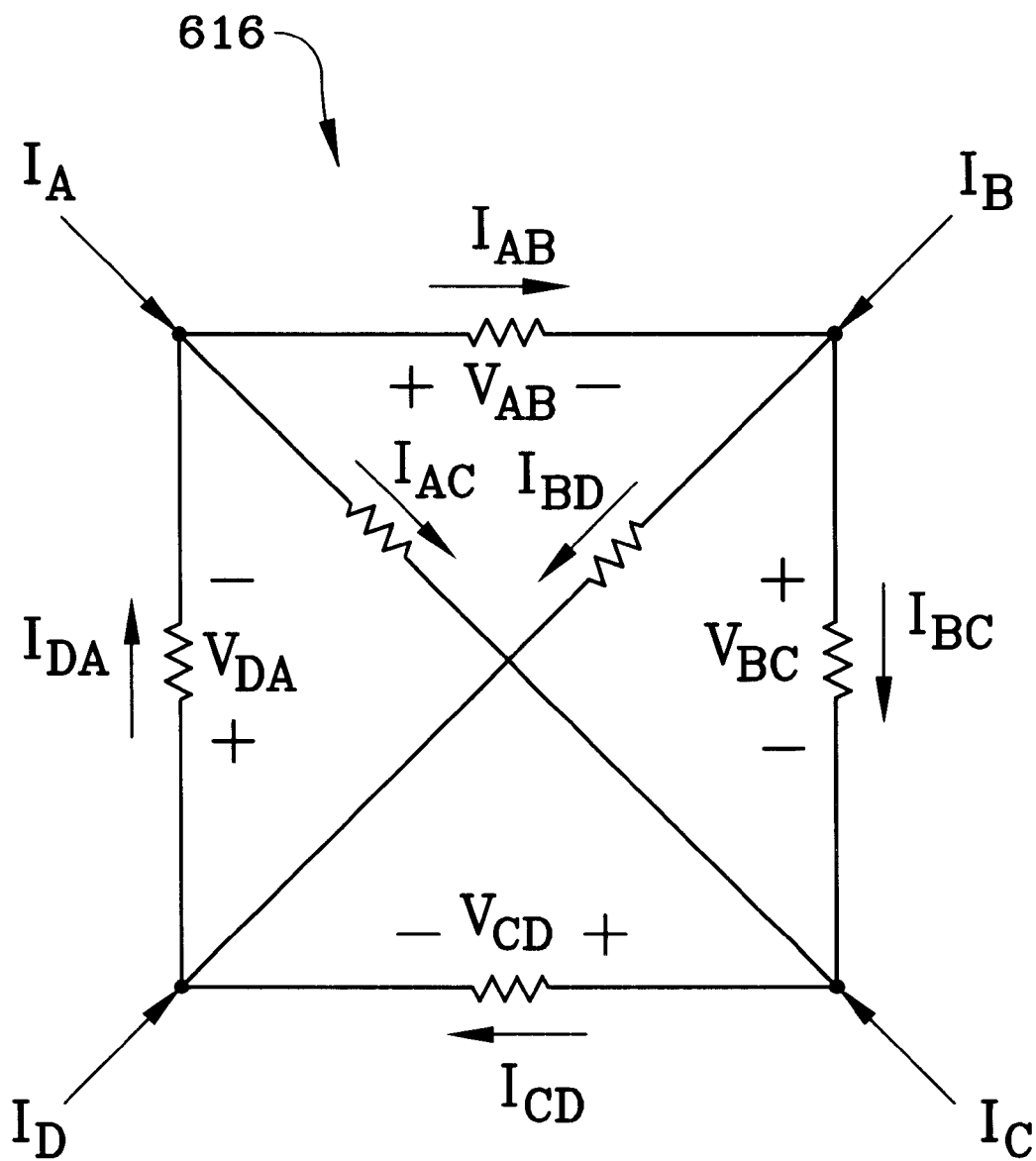
FIG. 6(a) is a circuit diagram illustrating signal currents flowing through the terminator of the four-conductor signaling system illustrated in FIG. 6.

FIG. 6(a) illustrates the terminator 616 and the currents through each of the terminator resistors R1–R6. Applying Kirchoff's current law to each of the nodes in the terminator, the nodal equations are:

$$I_A = I_{AB} + I_{AC} - I_{DA}, \quad (12)$$

$$I_B = I_{BC} - I_{AB} + I_{BD}, \quad (13)$$

$$I_C = I_{CD} - I_{BC} - I_{AC}, \text{ and} \quad (15)$$

$$I_D = I_{DA} - I_{BD} - I_{CD}. \quad (16)$$

Applying Kirchoff's voltage law to the loops of the terminator, the loop equations are:

$$V_{AB} + V_{BC} + V_{DA} = 0, \quad (17)$$

$$V_{AB} + V_{BD} + V_{DA} = 0, \quad (18)$$

$$V_{AC} + V_{CD} + V_{DA} = 0, \text{ and} \quad (19)$$

$$V_{BC} + V_{CD} - V_{BD} = 0. \quad (20)$$

Since $V_{AB} = I_{AB}R$, $V_{BC} = I_{BC}R$, $V_{AC} = I_{AC}R$, and $V_{CD} = I_{CD}R$, the equations corresponding to equations (17)–(20) for the currents are:

$$I_{AB} + I_{BC} + I_{DA} = 0, \quad (21)$$

$$I_{AB} + I_{BD} + I_{DA} = 0, \quad (22)$$

$$I_{AC} + I_{CD} + I_{DA} = 0, \text{ and} \quad (23)$$

$$I_{BC} + I_{CD} - I_{BD} = 0. \quad (24)$$

From equations (17)–(24), the equations for the voltages at the receiver input terminals for the four-conductor differential signaling system illustrated in FIG. 6 are:

$$V_{AB} = \tfrac{1}{4} * R(I_A - I_B), \quad (25)$$

$$V_{BC} = \tfrac{1}{4} * R(I_B - I_C), \quad (26)$$

$$V_{CD} = \frac{1}{4} * R(I_C - I_D), \text{ and} \quad (27)$$

$$V_{DA} = \frac{1}{4} R(I_D - I_A). \quad (28)$$

In order for a voltage difference to be present at each of the receivers, equations (25)–(28) illustrate that it is preferable that $I_A \neq I_B \neq I_C \neq I_D$. In addition, since four conductors connect the transmitters to the receivers, there are preferably four signal levels for each of the currents $I_A$, $I_B$, $I_C$, and $I_D$. Finally, for each combination of currents $I_A$, $I_B$, $I_C$, and $I_D$, it is preferable that the currents sum to zero.

Table 2 illustrates permissible values of the currents $I_A$, $I_B$, $I_C$, and $I_D$ that satisfy the preferred signaling conditions. In the table, the leftmost four columns correspond to current values for each of the symbols in the four-conductor differential signaling system. For example, in the first row, the first symbol that may be transmitted corresponds to current values of $I_A = -3i$, $I_B = -i$, $I_C = i$, and $I_D = 3i$. This symbol satisfies the preferred condition that the currents sum to zero because $-3i - i + i + 3i = 0$. The central six columns in the table illustrate the voltage differences across the inputs of the six differential receivers illustrated in FIG. 6. The non-zero voltage values in the six central columns indicate that each of the symbols results in non-zero voltage differences at the receivers.

In order for the system illustrated in FIG. 6 to be useful in computer communications, it is preferable that a coding scheme be selected that is capable of encoding eight-bit data units. Since $2^8 = 256$ symbols are required to encode all possible combinations of eight bits, it is preferable that the signaling system illustrated in FIG. 6 be extended to produce at least 256 symbols. The illustrated system is capable of producing 24 symbols. The lowest power of 24 that exceeds 256 is the second power. Thus, two of the four-conductor signaling systems illustrated in FIG. 6 may be connected in parallel to produce at least 256 symbols during a single symbol time. In an alternative arrangement, a single four-conductor signaling system as illustrated in FIG. 6 may transmit symbols in two successive time periods to produce 576 symbols. Since $24^2 = 576$, there is a surplus of $576 - 256 = 320$ symbols, which can be used for parity, error correction, DC balancing, or any other useful function. Coding for four-conductor differential signaling systems will be discussed in more detail below.

Although the embodiments described above with respect to FIGS. 5 and 6 are three- and four-conductor signaling systems, the present invention is not limited to these embodiments. For example, the signaling techniques according to the present invention can be extended to any N-conductor signaling system provided that the following two conditions are followed:

TABLE 2

Permissible Currents, Receiver Input Voltages, and Corresponding Bit Values for Four-Conductor Differential Signaling

| $I_A$ | $I_B$ | $I_C$ | $I_D$ | $V_{A-B}$ | $V_{B-C}$ | $V_{C-D}$ | $V_{D-A}$ | $V_{A-C}$ | $V_{B-D}$ | X | Y | Z | U | V | W |
|---|---|---|---|---|---|---|---|---|---|---|---|---|---|---|---|
| −3i | −i | +i | +3i | −1/2V | −1/2V | −1/2V | +3/2V | −V | −V | 0 | 0 | 0 | 1 | 0 | 0 |
| −i | +i | +3i | −3i | −1/2V | −1/2V | +3/2V | −1/2V | −V | +V | 0 | 0 | 1 | 0 | 0 | 1 |
| −3i | −i | +3i | +i | −1/2V | −V | +1/2V | +V | −3/2V | −1/2V | 0 | 0 | 1 | 1 | 0 | 0 |
| −3i | +i | +3i | −i | −V | −1/2V | +V | +1/2V | −3/2V | +1/2V | 0 | 0 | 1 | 1 | 0 | 1 |
| +i | +3i | −3i | −i | −1/2V | +3/2V | −1/2V | −1/2V | +V | +V | 0 | 1 | 0 | 0 | 1 | 1 |
| −3i | +i | −i | +3i | −V | +1/2V | −V | +3/2V | −1/2V | −1/2V | 0 | 1 | 0 | 1 | 0 | 0 |
| −3i | +3i | −i | +i | −3/2V | +V | −1/2V | +V | −1/2V | +1/2V | 0 | 1 | 0 | 1 | 0 | 1 |
| −i | +i | −3i | +3i | −1/2V | +V | −3/2V | +V | +1/2V | −1/2V | 0 | 1 | 0 | 1 | 1 | 0 |
| −i | +3i | −3i | +i | −V | +3/2V | −V | +1/2V | +1/2V | +1/2V | 0 | 1 | 0 | 1 | 1 | 1 |
| −i | +3i | +i | −3i | −V | +1/2V | +V | −1/2V | −1/2V | +3/2V | 0 | 1 | 1 | 0 | 0 | 1 |
| +i | +3i | −i | −3i | −1/2V | +V | +1/2V | −V | +1/2V | +3/2V | 0 | 1 | 1 | 0 | 1 | 1 |
| −3i | +3i | +i | −i | −3/2V | +1/2V | +1/2V | +1/2V | −V | +V | 0 | 1 | 1 | 1 | 0 | 1 |
| +3i | −3i | −i | +i | +3/2V | −1/2V | −1/2V | −1/2V | +V | −V | 1 | 0 | 0 | 0 | 1 | 0 |
| −i | −3i | +i | +3i | +1/2V | −V | −1/2V | +V | −1/2V | −3/2V | 1 | 0 | 0 | 1 | 0 | 0 |
| +i | −3i | −i | +3i | +V | −1/2V | −V | +1/2V | +1/2V | −3/2V | 1 | 0 | 0 | 1 | 1 | 0 |
| +i | −3i | +3i | −i | +V | −3/2V | +V | −1/2V | −1/2V | −1/2V | 1 | 0 | 1 | 0 | 0 | 0 |
| +i | −i | +3i | −3i | +1/2V | −V | +3/2V | −V | −1/2V | +1/2V | 1 | 0 | 1 | 0 | 0 | 1 |
| +3i | −3i | +i | −i | +3/2V | −V | +1/2V | −V | +1/2V | −1/2V | 1 | 0 | 1 | 0 | 1 | 0 |
| +3i | −i | +i | −3i | +V | −1/2V | +V | −3/2V | +1/2V | +1/2V | 1 | 0 | 1 | 0 | 1 | 1 |
| −i | −3i | +3i | +i | +1/2V | −3/2V | +1/2V | +1/2V | −V | −V | 1 | 0 | 1 | 1 | 0 | 0 |
| +3i | −i | −3i | +i | +V | +1/2V | −V | −1/2V | +3/2V | −1/2V | 1 | 1 | 0 | 0 | 1 | 0 |
| +3i | +i | −3i | −i | +1/2V | +V | −1/2V | −V | +3/2V | +1/2V | 1 | 1 | 0 | 0 | 1 | 1 |
| +i | −i | −3i | +3i | +1/2V | +1/2V | −3/2V | +1/2V | +V | −V | 1 | 1 | 0 | 1 | 1 | 0 |
| +3i | +i | −i | −3i | +1/2V | +1/2V | +1/2V | −3/2V | +V | +V | 1 | 1 | 1 | 0 | 1 | 1 |

The rightmost six columns represent valid input bit combinations corresponding to each symbol. For six binary data bits, there are $2^6 = 64$ possible bit combinations. However, 40 of these combinations fail to satisfy the preferred signal current conditions, resulting in 24 permissible symbols. Since each symbol represents 1 of 24 potential bit combinations, each symbol encodes $\log_2(24) = 4.585$ bits. In the embodiment illustrated in FIG. 6, each symbol is transmitted over four conductors. Thus, the efficiency of the system is $4.585/4 = 1.146$ bits per symbol per conductor. The efficiency of a single-ended signaling system is 1 bit/symbol/conductor. The efficiency of a four-conductor differential signaling system according to the present embodiment is thus higher than the efficiency of a single-ended signaling system.

1. The sum of the currents flowing through the conductors between the transmitter and the receiver is preferably zero.
2. The voltage difference between any pair of receiver input terminals is preferably non-zero.

In the differential signaling systems according to embodiments of the present invention, N−1 transmitter terminals are connected to each conductor, where N is an integer, preferably greater than two. Since receivers are connected across all pairs of conductors, the second condition on the signal currents implies that each of the conductors carry different currents. Each conductor may carry a current ranging from about $-(N-1)*i$ to no more than about $+(N-1)*i$, where i is the current output from a single transmitter, since there are preferably N−1 transmitter terminals attached to each conductor. In order to provide different currents on each conductor, the transmitter output terminals are preferably connected to the conductors such that the currents range from about $-(N-1)*i$ to no more than about $+(N-1)*i$ in steps of $2i$, resulting in N distinct signal levels. The valid symbols are permutations of these currents, so that there are $P(N)=N!$ possible states or symbols for an N-conductor signaling system. The efficiency of such a system is $2(\log_2(N!))/N$ bits per symbol per conductor. The number of transmitters (and receivers) is found by computing N things taken two at a time (N-choose-2), or $$C(N,2)=P(N,2)/2!=N!/(2(N-2)!), \qquad (29)$$

where $P(N,2)$ is the number of permutations of N things taken 2 at a time.

The present invention can also be generalized for transmitters and receivers that communicate using signal voltages rather than signal currents. In such an embodiment, both of the conditions described above for signal currents are preferably maintained. In such an embodiment, the voltages on N conductors preferably range from about $-(N-1)*v$ to no more than about $+(N-1)*v$. In addition, in order to maintain the second condition, the transmitter output terminals are preferably connected to the conductors such that the voltages range from about $-(N-1)*v$ to no more than about $+(N-1)*v$, in steps of $2v$. The efficiency for a signaling system transmitting voltage signals rather than current signals is the same as a system that transmits current symbols, e.g., $2(\log_2(N!))/N$ bits per symbol per conductor.

Table 3 shown below illustrates the number of conductors, the number of transmitters and receivers, the number of symbols, and the efficiency of exemplary multi-conductor signaling systems according to embodiments of the present invention. In the table, the first column represents the number of conductors for N-conductor signaling systems according to embodiments of the present invention. The second column represents the number of transmitters or receivers. The number of transmitters is preferably equal to the number of receivers. As stated above, the number of transmitters and receivers is equal to $N!/(2(N-2)!)$. The third column represents the number of symbols for each system, which is equal to $N!$. Finally, the fourth column represents the efficiency of each system in bits per symbol per conductor.

TABLE 3

Symbols and Efficiency for N-Conductor Differential Signaling

| N (# conductors) | N!/(2 · (N−2)!) (number of transmitters = number of receivers) | N! (# symbols) | Efficiency (bits/symbol/ conductor) |
| --- | --- | --- | --- |
| 2 | 1 | 2 | 0.5 |
| 3 | 3 | 6 | 0.8617 |
| 4 | 6 | 24 | 1.1462 |
| 5 | 10 | 120 | 1.3814 |
| 6 | 15 | 720 | 1.5820 |
| 7 | 21 | 5,040 | 1.7570 |
| 8 | 28 | 40,320 | 1.9124 |
| 9 | 36 | 362,880 | 2.0521 |
| 10 | 45 | 3,628,800 | 2.1791 |

As N increases in an N-conductor signaling system according to an embodiment of the present invention, the power required to deliver a given amount of bandwidth increases more rapidly than the power for a group of conventional two-conductor differential signaling systems delivering the same bandwidth. For example, the transmission power required for an N-conductor differential signaling system according to an embodiment of the present invention increases with the number of transmitters, which is illustrated in the second column of the table. For a four-conductor system, the required transmission power is $6i^2R$, where i is the signal current output from one of the transmitters and R is the resistance of one of the terminator resistors. Such a system delivers 4.5 bits per symbol per conductor. In order to deliver an equivalent bandwidth, 4.5 conventional two-conductor channels would be required, which would consume $4.5i^2R$ watts of power. However, even though some embodiments of the present invention may result in a slight increase in power consumption, the increase is more than offset by the reduction in conductors and pins between transmitters and receivers. Reducing the number of conductors and pins is especially important in computer chips where the number of pins available for input/output operations is limited.

Some factors that may limit the number of conductors in an N-conductor signaling system according to embodiments of the present invention include the complexity of the transmitter, data coding, and the maximum voltage swing at the receiver input. For example, as N increases, the number of discrete signal levels, which is equal to N, also increases. As a result, the number of differential voltages across any given pair of receiver input terminals, which is equal to the number of receivers or $N!/(2*(N-2)!)$, increases. As the number of signal levels increases, since each transmitter is required to deliver all of these signal levels, transmitter complexity may increase. In addition, since the voltage swing at a receiver's input terminals may be limited by the receiver power supply, the permissible number of discrete signal levels may be limited. Finally, as will be discussed in more detail below, increasing N increases the complexity of data coding circuitry. As a result, it may be preferable to limit multi-conductor signaling systems according to the present invention to groups of N conductors, where N is preferably no greater than about 6.

Coding for Multi-conductor Signaling Systems

In order for multi-conductor differential signaling systems according to embodiments of the present invention to be useful, an effective method is preferably defined for encoding binary data for transmission over an N-conductor signaling system. For example, in a computer communications system, data desired to be transmitted may be in binary form. Because of the conditions placed on signal currents and receiver input voltages, some combinations of binary data may be invalid inputs for an N-conductor signaling system according to an embodiment of the present invention. Thus, a method for coding binary data that avoids invalid input bit combinations is preferably defined.

The combinations of data bits received by the transmitters of an N-conductor signaling system are referred to herein as drive words. Since an N-conductor signaling system according to embodiments of the present invention preferably has $L=C(N,2)$ transmitters, each drive word is L bits wide. Although any invertible coding scheme may be used to map binary data into valid drive words, one method for coding the binary data according to the present invention includes defining a set of symbol numbers for an N-conductor differential signaling system, mapping input binary data into symbol numbers, and mapping the symbol numbers into valid drive words. As used herein, the term "symbol number" refers to a binary-encoded number denoting one of the base-N symbols suitable for transmission over an N-conductor differential signaling system according to embodiments of the present invention. Symbol numbers for an N-conductor differential signaling system may be M-bit binary numbers, where $M=\log_2(N!)$. The symbol numbers may have decimal values ranging from 0 to N!. The mapping of the symbol numbers to valid drive words is preferably implemented in a manner that reduces the complexity of logic circuitry required to perform the mapping. The following examples illustrate exemplary mapping schemes for mapping symbol numbers to valid drive words for three- and four-conductor signaling systems.

Symbol Number to Valid Drive Word Coding for Three-Conductor Differential Signaling Table 4 shown below illustrates exemplary valid drive words for a three-conductor signaling system according to an embodiment of the present invention. In the table, there are six valid three-bit drive words. Accordingly, in a three-conductor signaling system, six three-bit symbol numbers having decimal values from 0 to 5 may be encoded.

TABLE 4

| Valid Drive Words for Three-Conductor Signaling Systems | | |
|---|---|---|
| $X_{In}$ | $Y_{In}$ | $Z_{In}$ |
| 0 | 0 | 1 |
| 0 | 1 | 0 |
| 0 | 1 | 1 |
| 1 | 0 | 0 |
| 1 | 0 | 1 |
| 1 | 1 | 0 |

One method for mapping the symbol numbers is to directly map symbol numbers to drive words, when a symbol number matches a drive word. Table 5 shown below is a truth table for mapping a three-bit symbol number b2b1b0 to a valid drive word XYZ for a three-conductor signaling system according to an embodiment of the present invention. Symbol numbers 001 and 101 map directly to drive words 001 and 101 in Table 5. Symbol number 000 may be mapped into drive word 110, utilizing a simple logic circuit or other equivalent method.

TABLE 5

| Symbol Number to Valid Drive Word Mapping for Three-Conductor Signaling System | | | | | |
|---|---|---|---|---|---|
| b2 | b1 | b0 | X | Y | Z |
| 0 | 0 | 0 | 1 | 1 | 0 |
| 0 | 0 | 1 | 0 | 0 | 1 |
| 0 | 1 | 0 | 0 | 1 | 0 |
| 0 | 1 | 1 | 0 | 1 | 1 |
| 1 | 0 | 0 | 1 | 0 | 0 |
| 1 | 0 | 1 | 1 | 0 | 1 |

Figure 7:
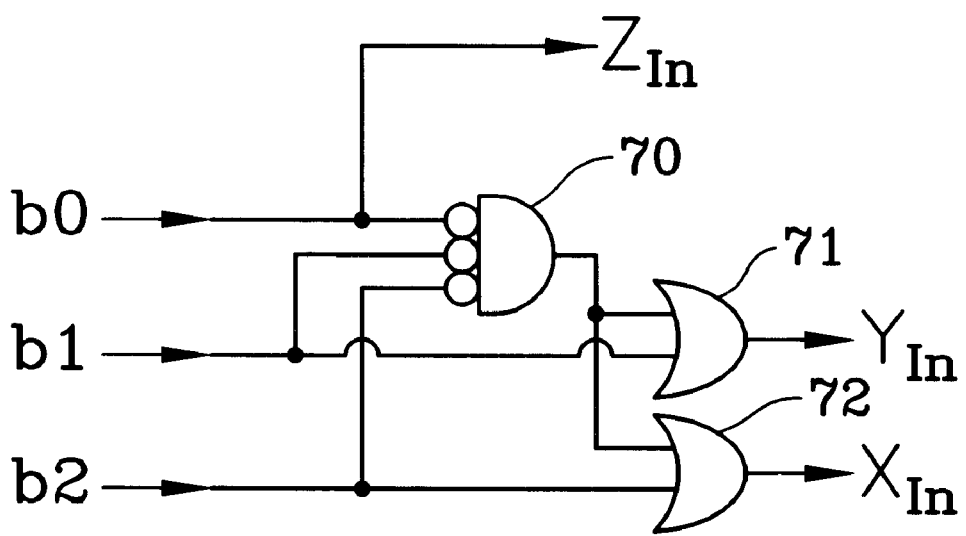
FIG. 7 is a logic diagram illustrating an exemplary encoder for converting symbol numbers into valid drive words for the three-conductor differential signaling system illustrated in FIG. 5.

FIG. 7 illustrates an exemplary encoder for mapping symbol numbers into valid drive words for a three-conductor signaling system. The encoder illustrated in FIG. 7 may be coupled to the inputs of the transmitters illustrated in FIG. 5 to supply valid drive words based on input symbol numbers. In the illustrated embodiment, the circuit includes an AND gate 70 and two OR gates 71 and 72. The AND gate 70 includes three input terminals receiving inverted bits b0, b1, and b2 of a symbol number. Each of the OR gates 71 and 72 includes two inputs. The first input of each of the OR gates receives the output from the AND gate 70. The second input of each of the OR gates 71 and 72 receives one of the bits of the symbol number.

The encoder illustrated in FIG. 7 maps three-bit symbol numbers 000–101 to valid drive words for the three-conductor signaling system illustrated in FIG. 5. For example, when the input symbol number is 000, the output drive word is 110, as previously described. The remaining symbol numbers, 001–101, map directly to drive words 001–101.

Figure 8:
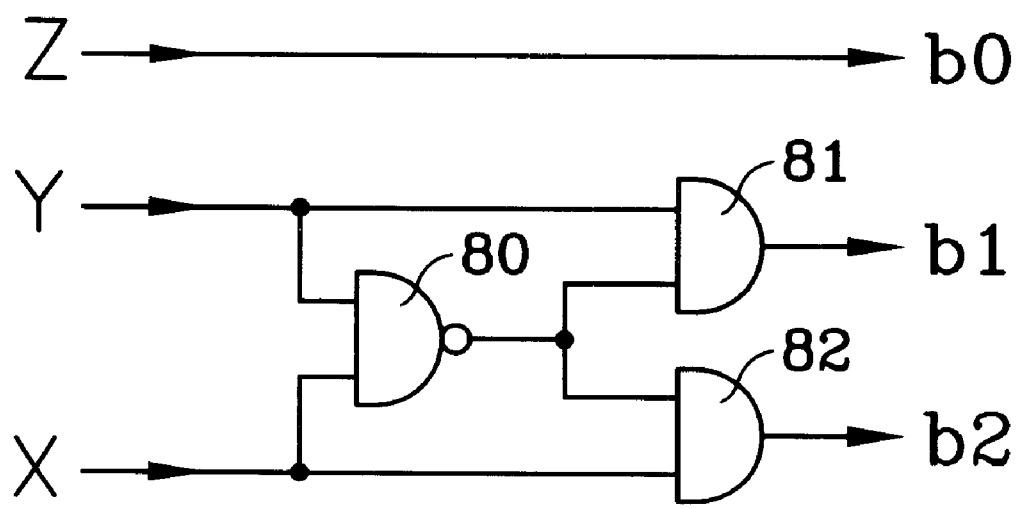
FIG. 8 is a logic diagram illustrating an exemplary decoder for converting data output from the differential receivers into corresponding symbol numbers for the three-conductor differential signaling system illustrated in FIG. 5.

FIG. 8 is a logic diagram illustrating an exemplary decoder for converting data output from the receivers of a three-conductor differential signaling system into corresponding symbol numbers. In the illustrated embodiment, the decoder includes a NAND gate 80 and AND gates 81 and 82. The logic circuit illustrated in FIG. 8 inverts the mapping performed by the encoder illustrated in FIG. 7.

The present invention is not limited to utilizing logic circuitry to map symbol numbers to valid drive words. For example, the mapping may be performed in software or a combination of hardware and software. If the mapping is performed in software, a look-up table or computer-implemented algorithm corresponding to Table 5 may be utilized to map and un-map the symbol numbers.

Symbol Number to Valid Drive Word Coding for a Four-conductor Differential Signaling System As described above with respect to FIG. 6, a four-conductor signaling system is capable of transmitting 24 possible symbols, each having a corresponding drive word of six bits in width. Symbol numbers for a four-conductor signaling system may be five-bit binary numbers having decimal values ranging from 0 to 23. Thus, it is desirable to determine an efficient and invertible method for mapping the five-bit symbol numbers to valid drive words.

The mapping for converting the symbol numbers to valid drive words may be performed by logic circuitry, software, or a combination of logic circuitry and software. If the mapping is performed in software, a look-up table or computer-implemented algorithm may be used to perform the mapping.

In mapping the symbol numbers to valid drive words in either hardware or software, it is preferable to simplify the mapping. One exemplary method for simplifying the mapping includes grouping valid drive words having common bit characteristics and mapping symbol numbers to the re-grouped drive words. For example, the rightmost four columns in Table 2 illustrate the valid drive words for a four-conductor signaling system. In Table 2, the drive words are arranged in ascending order according to the decimal values corresponding to the valid drive words. Although the symbol numbers $00000_2$–$10111_2$ could be mapped directly to the valid drive words, such a mapping would result in software or logic circuitry that is unnecessarily complex.

Table 6 shown below illustrates a reorganization of the valid drive words for a four-conductor signaling system that reduces the complexity of mapping circuitry and/or software. In Table 6, the valid drive words are arranged in four groups of six having common bit values for channels V and W. In a first group comprising rows 1–6 of Table 6, the bit values for the V and W channels are 00. In a second group comprising rows 7–12 in Table 6, the bit values for the V and W channels are 11. In a third group comprising rows 13–18 in Table 6, the bit values for the V and W channels are 01. In a fourth group comprising rows 19–24 in Table 6, the bit values for the V and W channels are 10. The bit values for the V and W channels in the first group are inverses of the bit values for the V and W channels of the second group. Similarly, the bit values for the V and W channels in the third group are inverses of the bit values for the V and W channels in the fourth group. Based on these observations, an encoder for encoding the 23 symbol numbers to valid drive words can be constructed using 23-input, four output look-up tables of six entries each, a multiplexor, and a set of XOR functions.

TABLE 6

Groupings of Valid Drive Words for a
4-Conductor Differential Signaling System

| X | Y | Z | U | V | W |
|---|---|---|---|---|---|
| 0 | 0 | 0 | 1 | 0 | 0 |
| 0 | 0 | 1 | 1 | 0 | 0 |
| 0 | 1 | 0 | 1 | 0 | 0 |
| 1 | 0 | 0 | 1 | 0 | 0 |
| 1 | 0 | 1 | 0 | 0 | 0 |
| 1 | 0 | 1 | 1 | 0 | 0 |
| 0 | 1 | 0 | 0 | 1 | 1 |
| 0 | 1 | 0 | 1 | 1 | 1 |
| 0 | 1 | 1 | 0 | 1 | 1 |
| 1 | 0 | 1 | 0 | 1 | 1 |
| 1 | 1 | 0 | 0 | 1 | 1 |
| 1 | 1 | 1 | 0 | 1 | 1 |
| 0 | 0 | 1 | 0 | 0 | 1 |
| 0 | 0 | 1 | 1 | 0 | 1 |
| 0 | 1 | 0 | 1 | 0 | 1 |
| 0 | 1 | 1 | 0 | 0 | 1 |
| 0 | 1 | 1 | 1 | 0 | 1 |
| 1 | 0 | 1 | 0 | 0 | 1 |
| 0 | 1 | 0 | 1 | 1 | 0 |
| 1 | 0 | 0 | 0 | 1 | 0 |
| 1 | 0 | 0 | 1 | 1 | 0 |
| 1 | 0 | 1 | 0 | 1 | 0 |
| 1 | 1 | 0 | 0 | 1 | 0 |
| 1 | 1 | 0 | 1 | 1 | 0 |

In order the further simplify the encoding and decoding circuitry, it is noted that the remaining bits of the drive words for V, W=01 are a one-bit left rotation of the drive words for V, W=00. As a result, the encoder can be designed utilizing a single look-up table having three input bits and six valid combinations of four output bits. Table 7 illustrates bit combinations on which such an encoder may be based. Table 8 is a permutation of Table 7, in which the lowermost two rows are re-arranged such that the LSB alternates between 0 and 1.

TABLE 7

X, Y, Z and U Bit Values for V, W = 00

| X | Y | Z | U |
|---|---|---|---|
| 0 | 1 | 0 | 1 |
| 1 | 0 | 0 | 0 |
| 1 | 0 | 0 | 1 |
| 1 | 0 | 1 | 0 |
| 1 | 1 | 0 | 0 |
| 1 | 1 | 0 | 1 |

TABLE 8

Re-Arranged Drive Words of Table 7 so that
U Alternates between 0 and 1

| X | Y | Z | U |
|---|---|---|---|
| 0 | 1 | 0 | 1 |
| 1 | 0 | 0 | 0 |
| 1 | 0 | 0 | 1 |
| 1 | 0 | 1 | 0 |
| 1 | 1 | 0 | 1 |
| 1 | 1 | 0 | 0 |

Figure 9:
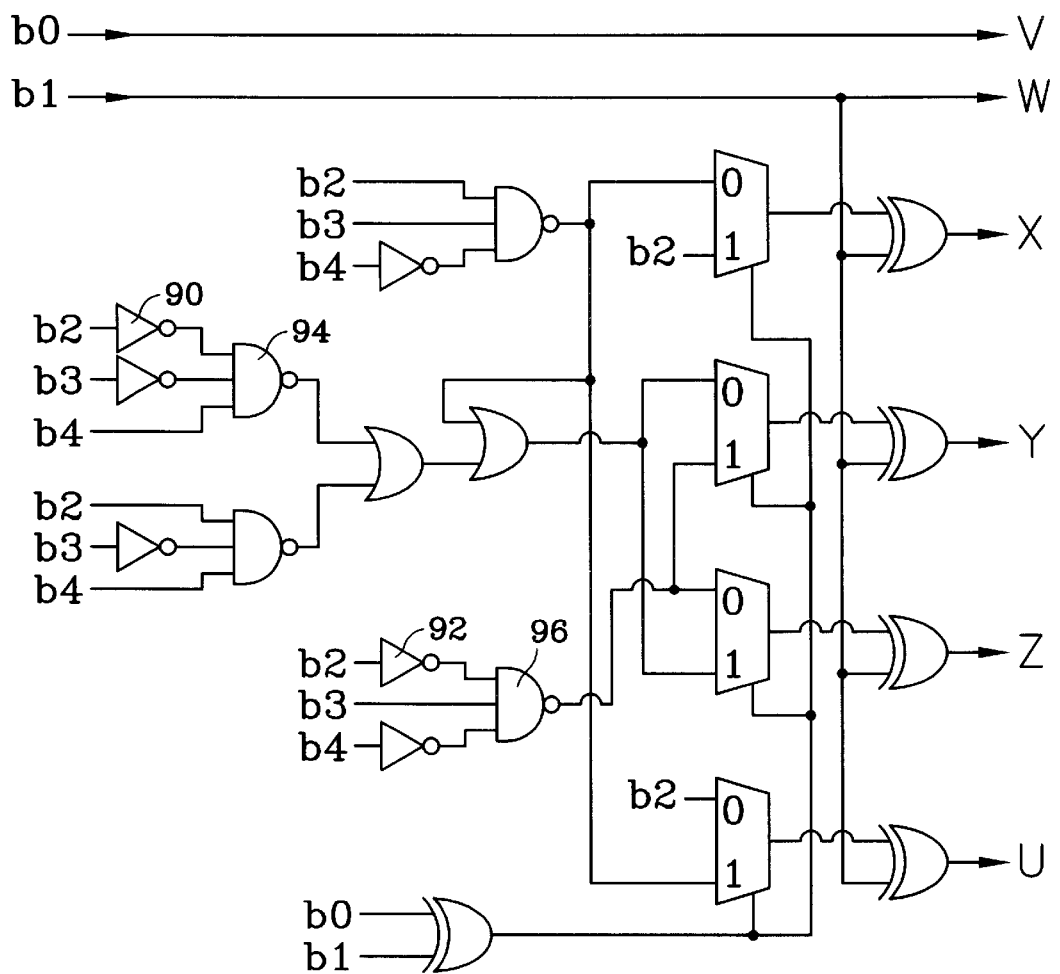
FIG. 9 is a logic diagram illustrating an exemplary encoder for converting a five-bit symbol number into a valid drive word for the four-conductor differential signaling system illustrated in FIG. 6.

FIG. 9 illustrates an encoder based on Table 8. The encoder illustrated in FIG. 9 converts a five-bit symbol number b0–b4 into a valid drive word UVWXYZ for a four-conductor differential signaling system according to an embodiment of the present invention. The encoder illustrated in FIG. 9 includes only twenty-one logic gates, thus illustrating the value of rearranging the valid drive codes. However, the present invention is not limited to the exact number of logic gates illustrated in FIG. 9. For example, the number of inverters may be reduced by utilizing a single inverter for each signal requiring inversion. In the illustrated embodiment, inverters 90 and 92 are connected to NAND gates 94 and 96 to invert the signal b2. These inverters may be replaced by a single inverter having an output connected to both NAND gate 94 and NAND gate 96. Similar reductions can be made for the signals b3 and b4.

Binary Data to Symbol Number Coding for a Four-
conductor Differential Signaling System The previous section illustrates methods and systems for encoding five-bit symbol numbers into valid drive words for a four-conductor signaling system. This section illustrates exemplary methods and systems for encoding binary data into symbol numbers. According to a first method, a nine-bit data word D{8:0} and an additional control bit are encoded into two five-bit symbol numbers, b0{4:0} and b1{4:0}. Two instances of the encoder illustrated in FIG. 9 may then be used to drive a four-conductor signaling system according to an embodiment of the present invention.

Encoding a nine-bit data word into two five-bit symbol numbers can be accomplished utilizing any suitable method, e.g., logic circuitry and/or a look-up table implemented in a read-only memory. Since the look-up table may be large, especially for values of N greater than four, it is preferable to simplify the logic.

In this example, a data word having nine bits is encoded into two symbol numbers of five bits each. Since 8 is the largest power of 2 that is a common factor of both 32 and 24, the three lowest-order bits of each portion of the nine-bit data word can be mapped directly to each five-bit symbol number. As a result, only two bits of each portion remain for processing.

In order to encode the nine-bit data word into five-bit symbol numbers, six of the bits of the nine bit data word are mapped directly to the symbol number. For example, where the bits of the data word are D0–D8 are the bits of the data word, b00–b05 are the bits of the first five bit symbol number, and b10–b15 are the bits of the second symbol number, the mapping may be performed as follows: b00=D0, b01=D1, b10=D5, b11=D6, and B12=D7. The remaining bits of the data word, D3, D4, and D8 may be passed through logic circuitry to generate the high order two bits of each five-bit symbol number.

Table 9 shown below is a truth table illustrating four functions of the three bits D3, D4, and D8. The tenth bit, illustrated by the column labeled "K" in Table 8 may be utilized for transmission of 64 control words, in addition to the 512 data words represented by each combination of four bits. Based on Table 9, a logic circuit or a look-up table may be implemented for mapping the remaining three bits of the data word and the control bit into the symbol numbers.

TABLE 9

Truth Table for Encoding D3, D4, D8, and K into Symbol Numbers

| K | D8 | D4 | D3 | b14 | b13 | b04 | b03 |
|---|----|----|----|-----|-----|-----|-----|
| 0 | 0  | 0  | 0  | 0   | 0   | 0   | 0   |
| 0 | 0  | 0  | 1  | 0   | 0   | 0   | 1   |
| 0 | 0  | 1  | 0  | 0   | 0   | 1   | 0   |
| 0 | 0  | 1  | 1  | 1   | 0   | 0   | 0   |
| 0 | 1  | 0  | 0  | 0   | 1   | 0   | 0   |
| 0 | 1  | 0  | 1  | 0   | 1   | 0   | 1   |
| 0 | 1  | 1  | 0  | 0   | 1   | 1   | 0   |
| 0 | 1  | 1  | 1  | 1   | 0   | 0   | 1   |
| 1 | 0  | 0  | 0  | 1   | 0   | 1   | 0   |

Figure 10:
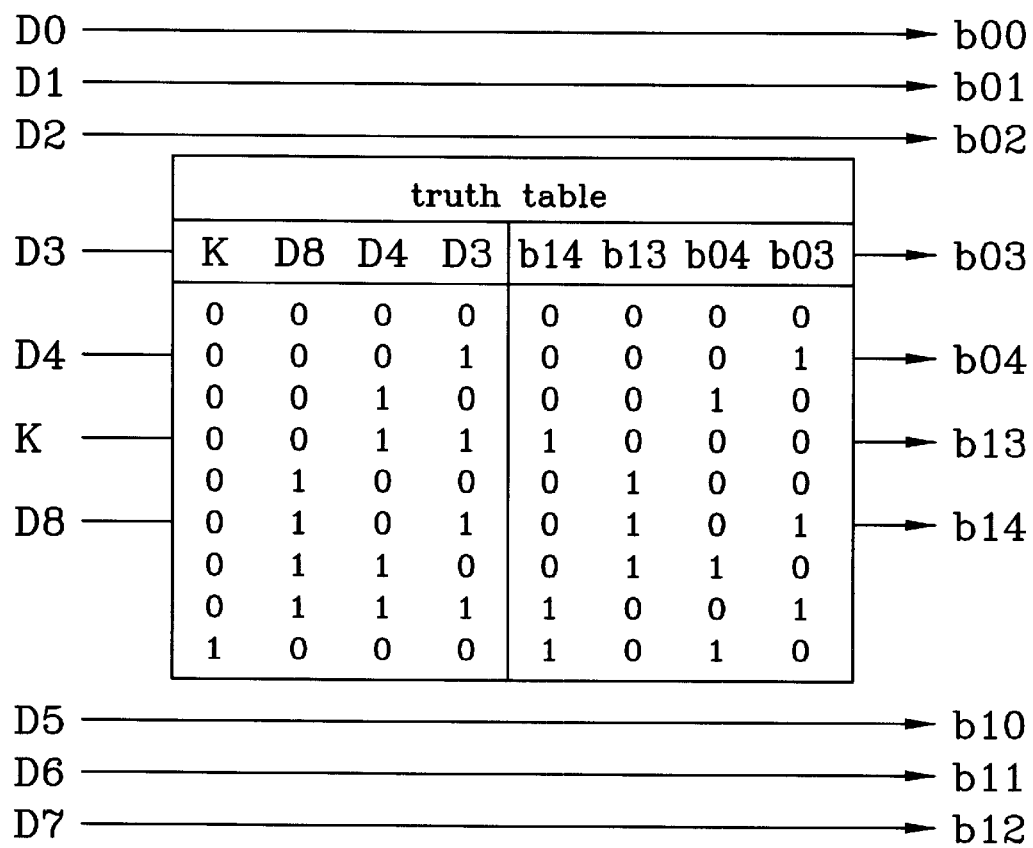
FIG. 10 is a schematic diagram including a truth table for encoding a nine-bit data word and a control bit into two five-bit symbol numbers according to an embodiment of the present invention.

FIG. 10 is a pseudo-schematic diagram implementing an encoder for encoding a nine-bit data word plus a control bit into two five-bit symbol numbers according to an embodiment of the present invention. The logic circuit illustrated in FIG. 10 may be connected to two encoders, as illustrated in FIG. 9, so that the binary data can be encoded into symbol numbers and then into valid drive words for signaling over a four-conductor differential signaling system according to an embodiment of the present invention.

Figure 11:
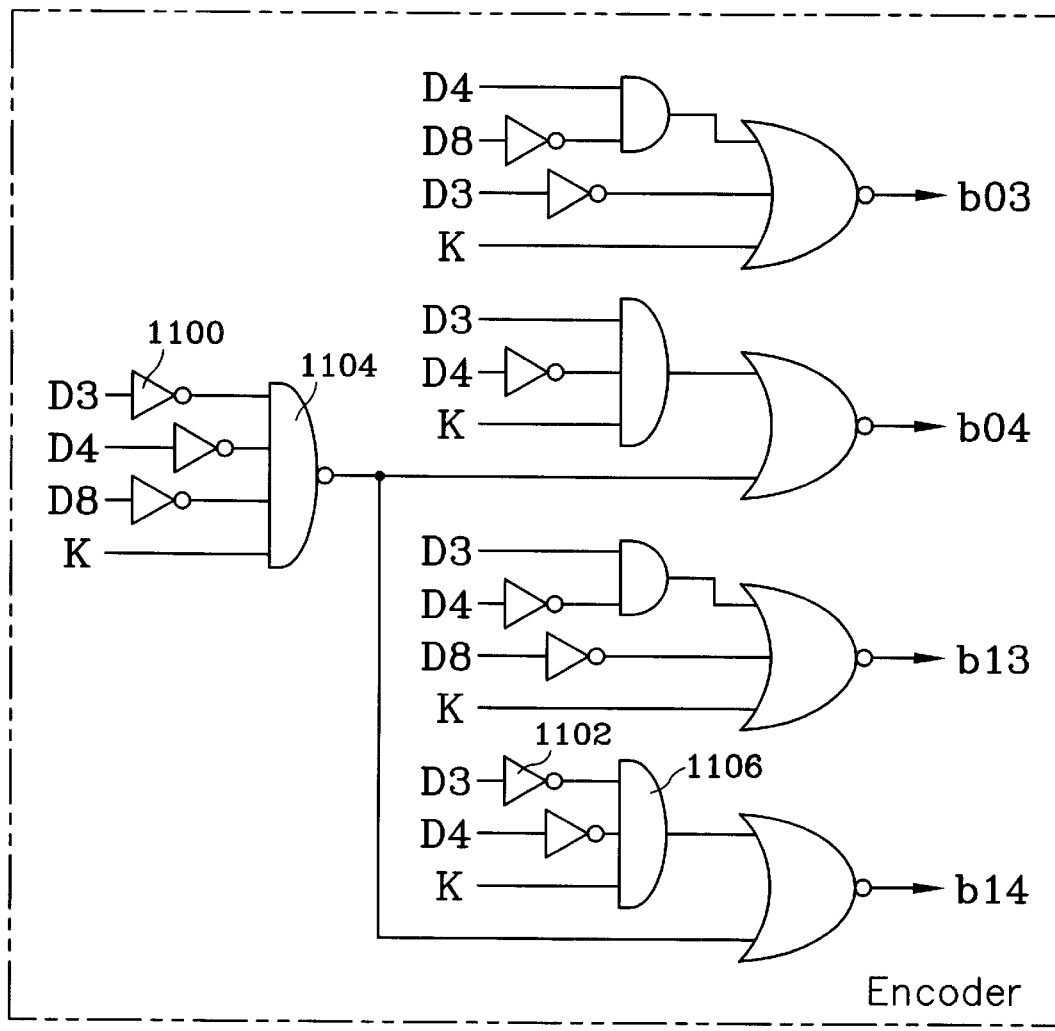
FIG. 11 is a logic diagram of an encoder corresponding to the truth table illustrated in FIG. 10.
Figure 12:
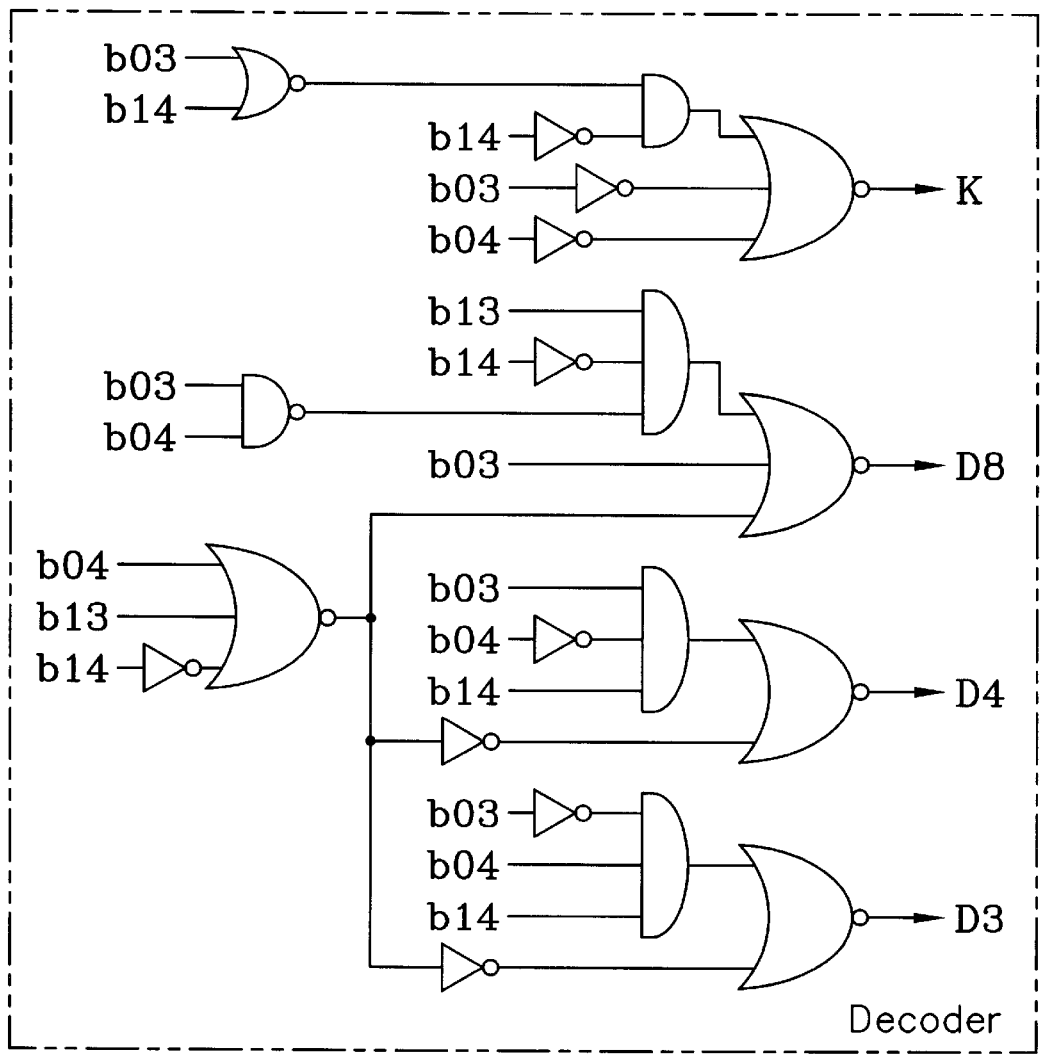
FIG. 12 is a logic diagram of a decoder corresponding to the truth table illustrated in FIG. 10.

FIGS. 11 and 12 are exemplary logic diagrams of an encoder and a decoder implementing the truth table portion of FIG. 10. More particularly, FIG. 11 is an encoder that implements the conversion from the left half of the truth table illustrated in FIG. 10 to the right half of the truth table illustrated in FIG. 10. FIG. 12 is a decoder implementing conversion from the right half of the truth table illustrated in FIG. 10 to the left half of the truth table illustrated in FIG. 10. Although the logic circuits illustrated in FIGS. 11 and 12 include a plurality of inverters, one of ordinary skill in the art will recognize that a single inverter may be provided for inverting each signal. For example, as illustrated in FIG. 11, separate inverters 1100 and 1102 are included for inverting the signal D3 at the input of a NAND gate 1104 and an AND gate 1106. These inverters may be replaced by a single inverter having an output connected to both the NAND gate 1104 and the AND gate 1106. Similar substitutions may be made for other signals in FIGS. 11 and 12. Multiple inverters are shown in order to more clearly illustrate circuit connections.

The present invention is not limited to the logic circuits illustrated in FIGS. 11 and 12 for the encoder and the decoder. Equivalent logic circuitry that implements the truth table illustrated in FIG. 10 is within the scope of the invention.

DC Balanced Coding

According to another aspect of the invention, it may be preferable to encode binary data such that direct current transmitted across a data channel is DC balanced. DC balancing is especially important when the transmitters and receivers in an N-conductor signaling system according to an embodiment of the present invention have separate power supplies. In such an embodiment, it is preferable to insert coupling capacitors in the conductors between the transmitters and receivers to prevent DC currents from flowing between the transmitters and receivers. In order to prevent excessive charge from building on the coupling capacitors, it may be desirable do structure drive words such that the number of 1's and 0's transmitted are substantially equal.

Voltage Mode Signaling

As stated above, the differential signal transmitters in the multi-conductor signaling systems according to embodiments of the present invention may output either signal voltages or signal currents onto the conductors. In embodiments that output signal currents, for example, as illustrated in FIG. 5, signals from N−1 of the N!/(2*(N−2)!) transmitters are summed onto each of the N conductors in a multi-conductor system. Current summation is accomplished by connecting the transmitter terminals to the conductors. In embodiments where the transmitters output signal voltages, a mechanism for adding the voltages from multiple transmitters before applying the voltages to the conductors is required.

Figure 1:
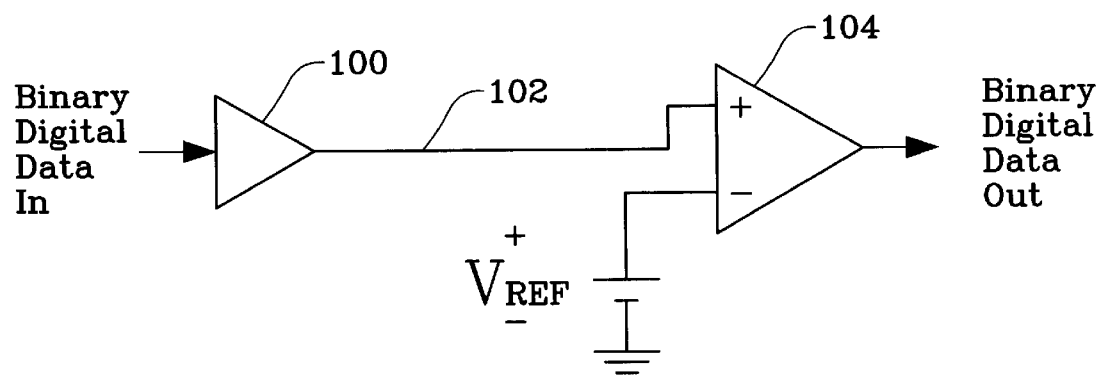
FIG. 1 is a circuit diagram illustrating a conventional single-ended signaling system.
Figure 2:
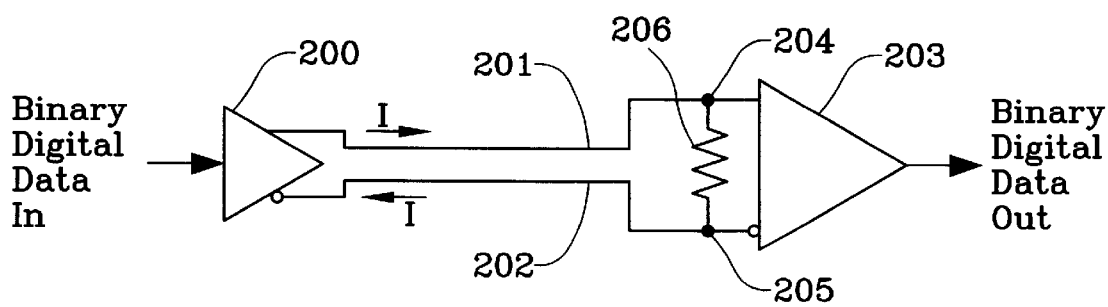
FIG. 2 is a circuit diagram illustrating a conventional two-conductor differential signaling system.
Figure 3:
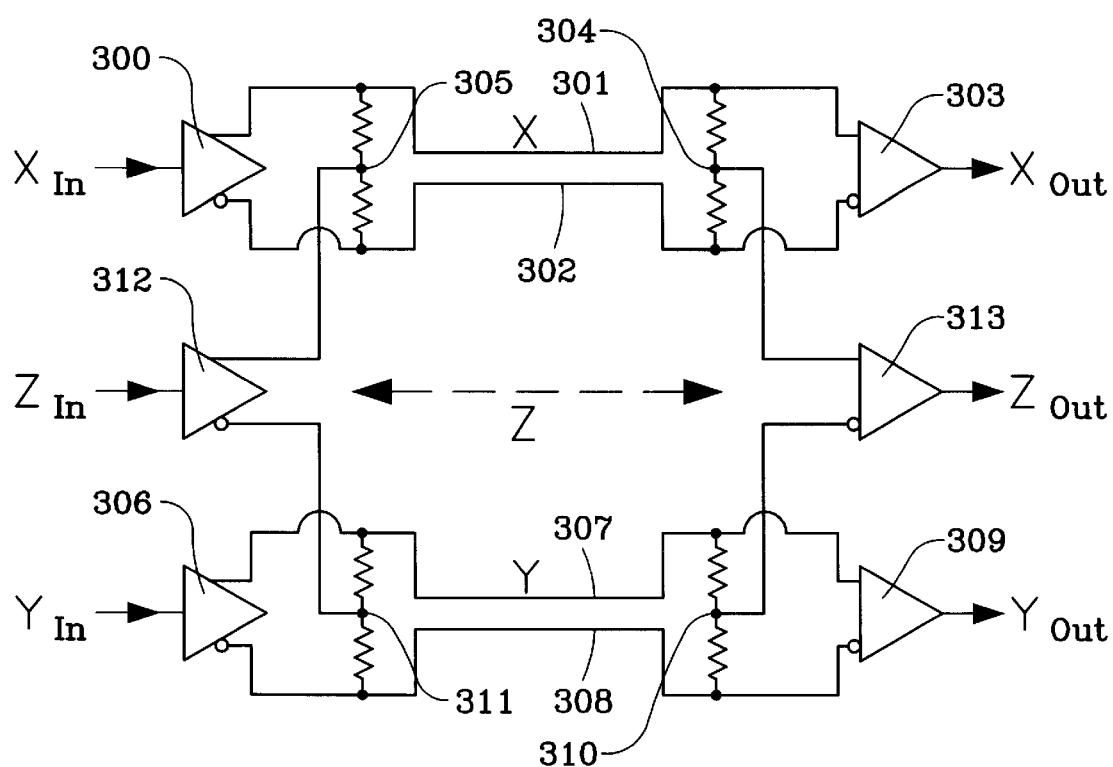
FIG. 3 is a circuit diagram illustrating a conventional differential signaling system including a phantom channel.
Figure 4:
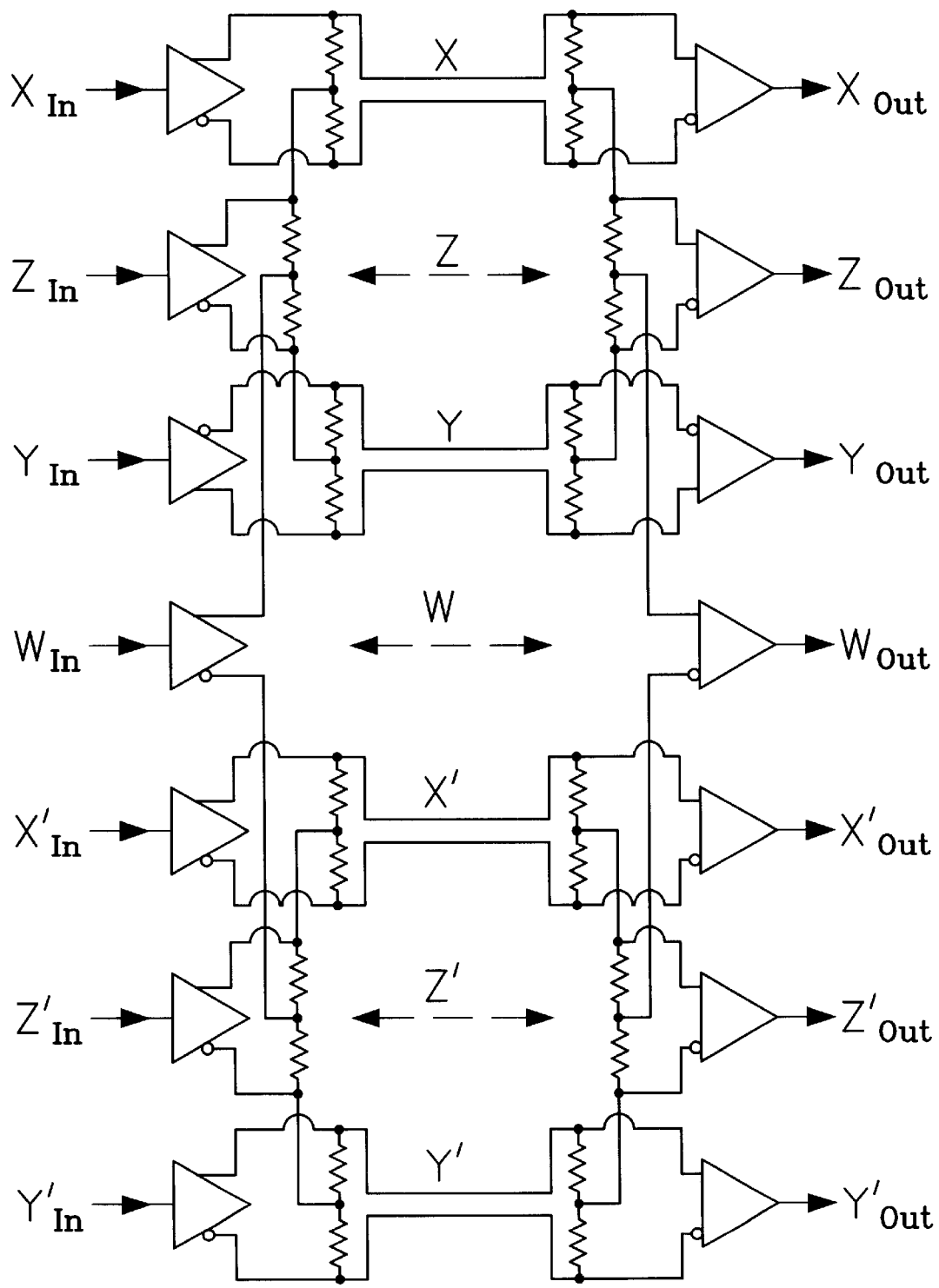
FIG. 4 is a circuit diagram illustrating a conventional differential signaling system including a ghost channel.
Figure 13:
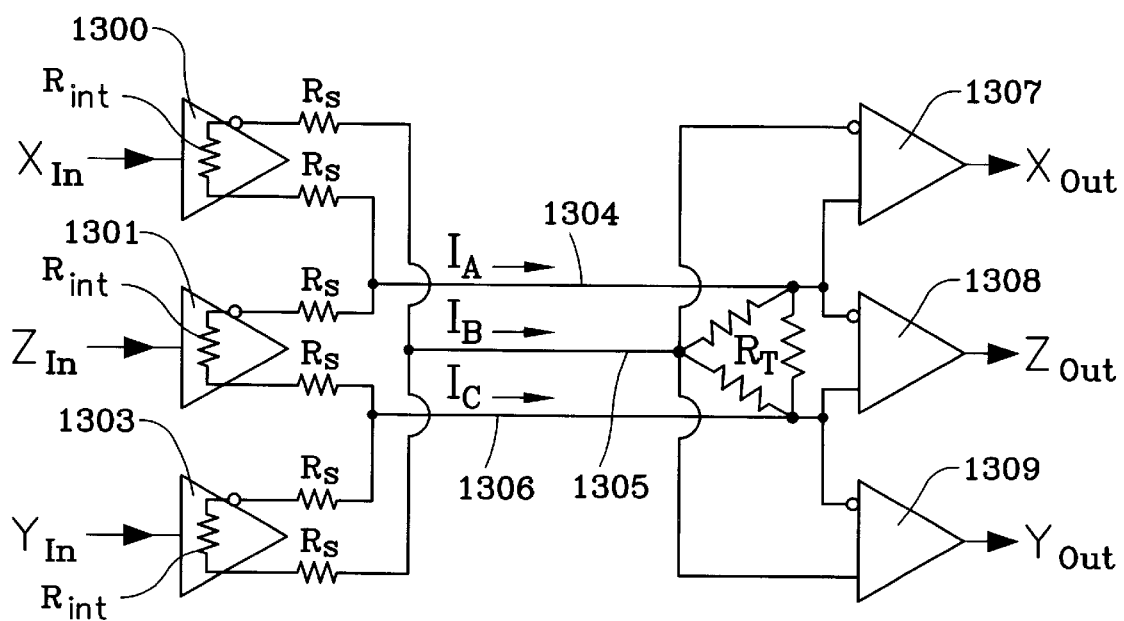
FIG. 13 is a schematic diagram of a three-conductor differential signaling system in which the transmitters output signal voltages according to an embodiment of the present invention.

One method for summing voltages from voltage mode transmitters is a resistor network. FIG. 13 illustrates a three-conductor differential signaling system in which the transmitters output signal voltages according to an embodiment of the present invention. In FIG. 13, transmitters 1300–1303 output signal voltages based on digital input data $X_{In}$, $Y_{In}$, and $Z_{In}$. A plurality of external series resistors $R_s$ convert the voltage outputs of the transmitters to currents, which are summed onto three transmission line conductors 1304–1306. Realizable voltage transmitters have non-zero internal impedance $R_{int}$. For proper impedance matching, it is preferable that $2*R_s+R_{int}=R_T$, where $R_T$ is the termination resistance. Because the resistors $R_s$ convert the output voltages of the transmitters 1301–1303 into currents, receivers 1307–1309 operate in a similar manner to the receivers in FIG. 3.

The present invention is not limited to the three-conductor voltage mode embodiment illustrated in FIG. 13. For example, the embodiment illustrated in FIG. 13 may be extended to N-conductor signaling systems where N is greater than three.

CMOS Current-mode Implementation

Figure 14:
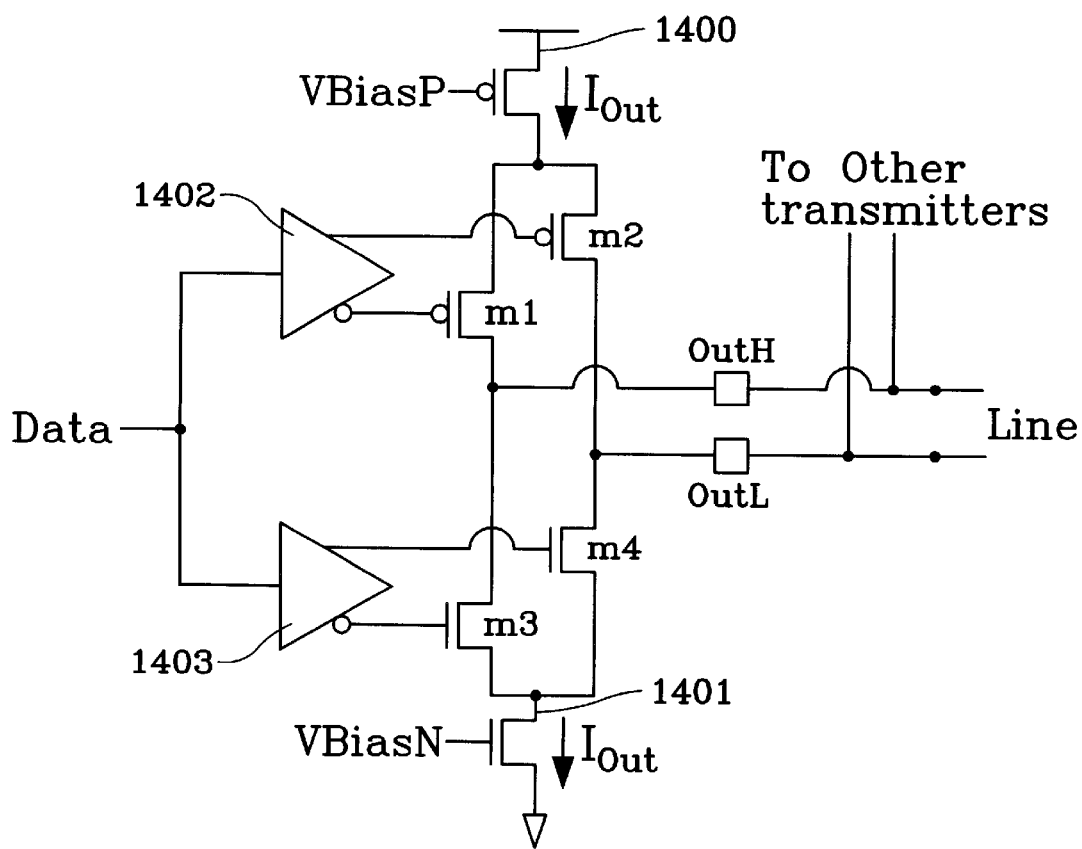
FIG. 14 is a schematic diagram of an exemplary current-mode transmitter implemented in CMOS technology according to an embodiment of the present invention.

Current-mode transmitters suitable for use in embodiments of the present invention can be readily implemented in CMOS technology. FIG. 14 illustrates an exemplary implementation of a suitable current-mode transmitter. In the illustrated example, transistors 1400 and 1401 are biased in the linear or saturation region by setting bias voltages VBiasN and VBiasP to the appropriate values. The transistors 1400 and 1401 operate as current sources and both carry the signaling current Iout. Transistors m1–m4 are arranged in an H-bridge configuration to steer the output current into the line. The transistors m1–m4 are controlled by a digital signal Data. Drivers 1402 and 1403 supply the transistors m1–m4 with non-inverted and inverted versions of the signal Data. When Data is high, m1 and m4 are turned ON, and m2 and m3 are turned OFF. In this condition, $I_{OUT}$ is driven into OutH and pulled out of OutL. When the signal Data is LOW, m2 and m3 are ON and the currents at the two output terminals OutH and OutL are reversed.

The present invention is not limited to the current-mode transmitter illustrated in FIG. 14. Any transmitter capable of switching a current into two halves of a differential transmission line are within the scope of the invention. For example, circuits designed to be compatible with the ANSI/

TIA/EIA-644-1995 low voltage differential signaling (LVDS) standard could be used in a multi-conductor signaling system with little or no changes to the signaling techniques described above.

Equalization

Frequency-dependent attenuation on realizable transmission lines leads to inter-symbol interference. For example, most transmission lines function as low-pass filters. As a result, high-frequency portions of a transmitted signal are attenuated more than the low-frequency portions. The frequency-dependent attenuation causes low-frequency symbols to interfere with high-frequency symbols. For fairly modest amounts of attenuation (6dB at the highest bit transmission frequency), this effect causes symbols to become undetectable. Equalization can be used to extend the bit transmission frequency considerably.

Equalization essentially introduces a filter, which can be placed in the transmission line at either the transmitter or receiver to compensate for the frequency-dependent attenuation of the line. The frequency response of an exemplary equalization filter suitable for use with the present invention may be the inverse of the frequency response of the transmission line being compensated. For example, the filter may be designed such that it has a gain near unity at frequencies where the transmission line attenuation is near 0 dB and a gain that increases with transmission line attenuation at frequencies where the transmission line attenuation is greater than 0 dB.

Exemplary equalization filters suitable for use with embodiments of the present invention are described in detail in "Transmitter Equalization for 4-GBPS Signaling," IEEE Micro, January/February 1997, pp. 48–56 and "A Tracking Clock Recovery Receiver for 4-GBPS Signaling," IEEE Micro, January–February 1998, pp. 25–27, the disclosures of which are incorporated herein by reference. Exemplary equalization filters suitable for use with embodiments of the present invention include continuous-time active or passive filters that selectively amplify high-frequency components of a transmitted signal. However, in a preferred embodiment of the invention, the equalization filter may comprises a discrete-time finite-impulse-response (FIR) equalizer. Such a filter may be implemented using a transition filter. A transition filter counts elapsed time between transitions in a transmitted signal and adjusts the gain based on the elapsed time. For example, if transitions occur in rapid succession, a high-frequency signal is being transmitted and the filter preferably increases the gain. If a long time period elapses between transitions, a low-frequency signal is being transmitted and the filter preferably does not amplify the signal.

Equalization filters can be used effectively in multi-conductor signaling. Each of the N!/(2*(N−2)!) channels on an N-conductor transmission system can be equalized independently, since the waves on the line for each channel are independent, by the principle of superposition. Thus, equalization filters may be incorporated within each differential transmitter, e.g., in transmitters 500–502 illustrated in FIG. 5, to compensate for transmission line interference in each channel.

It will be understood that various details of the invention may be changed without departing from the scope of the invention. Furthermore, the foregoing description is for the purpose of illustration only, and not for the purpose of limitation—the invention being defined by the claims.

What is claimed is:

1. A multi-conductor differential signaling method comprising transmitting K differential signals from a plurality of differential transmitters to a plurality of differential receivers over N conductors, N being an integer greater than two and K being equal to N!/(2(N−2)!), wherein:
    (a) each of the differential transmitters includes an inverting output and a non-inverting output, the inverting and non-inverting outputs being continuously connected to different conductors of the N conductors;
    (b) the K differential signals produce N currents on the N conductors and the N currents sum to substantially zero, and
    (c) the K differential signals produce K voltage differences between the N conductors and none of the voltage differences between the N conductors is equal to zero.

2. The method of claim 1, wherein N=3.

3. The method of claim 1, wherein N=4.

4. The method of claim 1, wherein N is greater than 4.

5. The method of claim 1, wherein transmitting K differential signals includes outputting K differential voltage signals from K differential voltage transmitters.

6. The method of claim 1, wherein transmitting K differential signals includes outputting K differential current signals from K differential current transmitters.

7. The method of claim 1, wherein transmitting K differential signals includes transmitting $2\log_2(N!)/N$ bits per symbol per conductor.

8. The method of claim 1, wherein transmitting the K differential signals includes equalizing high- and low-frequency portions of each of the K differential signals to compensate for frequency-dependent transmission line attenuation.

9. The method of claim 8, wherein equalizing the high and low frequency portions includes passing each of the K differential signals through a transition filter.

10. A method for encoding binary data on an N-conductor differential signaling system comprising:
    (a) receiving binary data to be transmitted over the N-conductor differential signaling system;
    (b) converting the binary data into symbol numbers, where each symbol number corresponds to a valid drive word to be input into differential transmitters of the N-conductor differential signaling system, each of the differential transmitters including an inverting output and a non-inverting output, the inverting and non-inverting outputs being continuously connected to different conductors of the N conductors; and
    (c) converting the symbol numbers into valid drive words the valid drive word comprising combinations of bits such that currents on the N conductors sum to zero and voltages across each pair of conductors of the N conductors do not sum to zero and inputting the valid drive words into the transmitters.

11. The method of claim 10 wherein:
    (a) receiving binary data includes receiving a nine-bit data word;
    (b) converting the binary data includes mapping the nine-bit data word into two five-bit symbol numbers; and
    (c) converting the symbol numbers into valid drive words includes converting the two five-bit symbol numbers into valid drive words for a four-conductor differential signaling system.

12. The method of claim 10, wherein converting the symbol numbers into valid drive words includes DC balancing the valid drive words.

13. The method of claim 12, wherein DC balancing the valid drive words includes structuring the drive words such that the number of 1's and 0's transmitted over a time period are substantially equal.

14. A multi-conductor differential signaling system for transmitting differential signals between a sender and a receiver comprising:
   (a) a plurality of differential transmitters for transmitting K differential signals on N conductors, N being an integer greater than 2 and K being equal to $N!/(2(N-2)!)$, wherein:
      (i) each of the differential transmitters includes an inverting output and a non-inverting output, the inverting and non-inverting outputs being continuously connected to different conductors of the N conductors;
      (ii) the K differential signals produce N currents on the N conductors and the N currents sum to substantially zero; and
      (iii) the K differential signals produce K voltage differences between the N conductors and none of the voltage differences between the N conductors is equal to zero; and
   (b) a plurality of differential receivers for receiving the K differential signals and converting the K differential signals to digital data.

15. The multi-conductor differential signaling system of claim 14, wherein the plurality of differential transmitters comprise differential current transmitters.

16. The multi-conductor differential signaling system of claim 15, wherein the plurality of differential transmitters comprise differential voltage transmitters.

17. The multi-conductor differential signaling system of claim 14, wherein N=3.

18. The multi-conductor differential signaling system of claim 14, wherein N=4.

19. The multi-conductor differential signaling system of claim 14, wherein N is greater than 4.

20. The multi-conductor differential signaling system of claim 14, comprising a first encoder connected to the plurality of differential transmitters for receiving symbol numbers and converting the symbol numbers into valid drive words for driving the plurality of differential transmitters to produce the K differential signals.

21. The multi-conductor differential signaling system of claim 20, comprising a second encoder connected to the first encoder for receiving binary data, converting the binary data into symbol numbers, and outputting the symbol numbers to the first encoder.

22. The multi-conductor signaling system of claim 20, wherein the first encoder comprises a logic circuit.

23. The multi-conductor differential signaling system of claim 20, wherein the first encoder comprises a lookup table embodied in a read only memory.

24. The multi-conductor differential signaling system of claim 21, wherein the second encoder comprises a logic circuit.

25. The multi-conductor differential signaling system of claim 21, wherein the second encoder comprises a lookup table embodied in a read only memory.

26. The multi-conductor differential signaling system of claim 14, wherein the plurality of differential transmitters transmit $2\log_2(N!)/N$ bits per symbol per conductor.

27. The multi-conductor differential signaling system of claim 14, wherein the plurality of differential transmitters comprises K differential transmitters and the plurality of differential receivers comprises K differential receivers.

28. The multi-conductor differential signaling system of claim 14, wherein the differential receivers convert the K differential signals into digital data without comparing the K differential signals to reference voltages at the receivers.

29. The multi-conductor differential signaling system of claim 14, comprising a plurality of equalization filters respectively coupled to the differential transmitters for amplifying high-frequency portions of each of the K differential signals more than low-frequency portions to compensate for frequency-dependent transmission line attenuation.

30. The multi-conductor differential signaling system of claim 29, wherein the equalization filters comprise transition filters.

31. The method of claim 1 wherein the non-inverting output of each differential transmitter is connected to the inverting output of another of the differential transmitters and to at least one of the conductors.

32. The method of claim 10 wherein the non-inverting output of each differential transmitter is connected to the inverting output of another of the differential transmitters and to at least one of the conductors.

33. The system of claim 14 wherein the non-inverting output of each differential transmitter is connected to the inverting output of another of the differential transmitters and to at least one of the conductors.

* * * * *